(12) United States Patent
Baek et al.

(10) Patent No.: US 12,457,633 B2
(45) Date of Patent: Oct. 28, 2025

(54) METHOD AND DEVICE FOR TRANSMITTING AND RECEIVING DATA IN WIRELESS COMMUNICATION SYSTEM

(71) Applicant: Samsung Electronics Co., Ltd., Suwon-si (KR)

(72) Inventors: Sangkyu Baek, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 17/999,208

(22) PCT Filed: May 17, 2021

(86) PCT No.: PCT/KR2021/006145
§ 371 (c)(1),
(2) Date: Nov. 17, 2022

(87) PCT Pub. No.: WO2021/235796
PCT Pub. Date: Nov. 25, 2021

(65) Prior Publication Data
US 2023/0209589 A1 Jun. 29, 2023

(30) Foreign Application Priority Data

May 21, 2020 (KR) .................. 10-2020-0061127
Oct. 15, 2020 (KR) .................. 10-2020-0133750

(51) Int. Cl.
*H04W 72/566* (2023.01)
*H04L 5/00* (2006.01)
(Continued)

(52) U.S. Cl.
CPC ........ *H04W 72/569* (2023.01); *H04L 5/0053* (2013.01); *H04W 72/1268* (2013.01);
(Continued)

(58) Field of Classification Search
CPC .......... H04W 72/569; H04W 72/1268; H04W 72/21; H04W 74/006; H04W 74/0836;
(Continued)

(56) References Cited

U.S. PATENT DOCUMENTS 10,616,913 B2   4/2020   Kim et al.
2019/0349061 A1  11/2019  Cirik et al.
(Continued)

FOREIGN PATENT DOCUMENTS

KR   10-2021-0123934 A   10/2021

OTHER PUBLICATIONS

Supplementary European Search Report dated Aug. 25, 2023, in connection with European Patent Application No. 21807645.3, 10 pages.
(Continued)

*Primary Examiner* — Candal Elpenord

(57) ABSTRACT

A method and device for transmitting and receiving data in a wireless communication system is provided. the method of a terminal includes, in case that transmission of a SR is pending and logical channel-based prioritization is configured for a MAC entity of the terminal, identifying whether a PUCCH resource associated with transmission of the SR overlaps with a PUSCH resource associated with transmission of a message A, in case that the PUCCH resource does not overlap with the PUSCH resource, identifying whether the PUCCH resource associated with the transmission of the SR overlaps with a PUSCH resource associated with uplink data, and in case that the PUCCH resource overlaps with the PUSCH resource, transmitting the SR or the uplink data to a base station by comparing a priority of the PUCCH resource with a priority of the PUSCH resource.

14 Claims, 14 Drawing Sheets

(51) Int. Cl.
*H04W 72/1268* (2023.01)
*H04W 72/21* (2023.01)
*H04W 74/0833* (2024.01)
*H04W 74/0836* (2024.01)

(52) U.S. Cl.
CPC ........ *H04W 72/21* (2023.01); *H04W 74/0833* (2013.01); *H04W 74/0836* (2024.01)

(58) Field of Classification Search
CPC . H04W 74/0833; H04L 5/0053; H04L 5/0094
USPC .................................................. 370/329–330
See application file for complete search history.

(56) References Cited

U.S. PATENT DOCUMENTS

| | | | |
|---|---|---|---|
| 2020/0236582 A1* | 7/2020 | Chin | H04W 72/23 |
| 2020/0275474 A1* | 8/2020 | Chen | H04L 1/1812 |
| 2021/0315018 A1 | 10/2021 | Baek et al. | |
| 2022/0109486 A1* | 4/2022 | Fu | H04L 5/0023 |
| 2022/0210777 A1* | 6/2022 | Li | H04W 72/044 |
| 2023/0058734 A1* | 2/2023 | Xiao | H04L 1/1812 |

OTHER PUBLICATIONS

"3rd Generation Partnership Project; Technical Specification Group Radio Access Network; NR; Medium Access Control (MAC) protocol specification (Release 16)", 3GPP TS 38.321 V16.0.0 (Mar. 2020), 142 pages.
InterDigital, "MAC handling of dropped SRs", 3GPP RAN WG2 Meeting #109-e, Feb. 24-Mar. 6, 2020, R2-2001101, 5 pages.
Oppo, "Discussion on SR cancelling on intra-UE prioritization involving SR", 3GPP TSG-RAN WG2 Meeting #109 electronic, Feb. 24-Mar. 6, 2020, R2-2000702, 4 pages.
Samsung, "Report of [Offline-036][IIOT] Data Data and Data SR prioritization", 3GPP TSG-RAN2 Meeting #109-e, Feb. 24-Mar. 6, 2020, R2-2002190, 40 pages.
International Search Report dated Aug. 17, 2021 in connection with International Patent Application No. PCT/KR2021/006145, 2 pages.
Communication under Rule 71(3) EPC dated Nov. 12, 2024, in connection with European Application No. 21807645.3, 64 pages.
Communication under Rule 71(3) EPC dated Mar. 20, 2025, in connection with European Application No. 21807645.3, 64 pages.
Notice of Allowance dated Aug. 5, 2025, in connection with European Application No. 21 807 645.3, 64 pages.

* cited by examiner

METHOD AND DEVICE FOR TRANSMITTING AND RECEIVING DATA IN WIRELESS COMMUNICATION SYSTEM

CROSS-REFERENCE TO RELATED APPLICATIONS

This application is a 371 National Stage of International Application No. PCT/KR2021/006145 filed on May 17, 2021, which claims priority to Korean Patent Application No. 10-2020-0061127 filed on May 21, 2020, and Korean Patent Application No. 10-2020-0133750 filed on Oct. 15, 2020, the disclosures of which are herein incorporated by reference in their entirety.

BACKGROUND

1. Field

The present disclosure relates to a method and device for transmitting and receiving data in a wireless communication system.

2. Description of Related Art

To meet the demand for wireless data traffic having increased since deployment of $4^{th}$ Generation (4G) communication systems, efforts have been made to develop an improved $5^{th}$ Generation (5G) or pre-5G communication system. For this reason, 5G or pre-5G communication system is also called 'Beyond 4G Network' or 'Post Long-Term Evolution (LTE) System'. The 5G communication system is considered to be implemented in ultra-high frequency (millimeter (mm)Wave) bands, (e.g., 60 gigahertz (GHz) bands), so as to accomplish higher data rates. In order to mitigate path loss of radio waves and increase a propagation distance of radio waves in an ultra-high frequency band, beamforming, massive multiple-input and multiple-output (MIMO), full-dimensional MIMO (FD-MIMO), array antenna, analog beamforming, and large-scale antenna technologies have been discussed in 5G communication systems. In addition, in order to improve a network of a 5G communication system, technologies such as evolved small cells, advanced small cells, cloud radio access networks (cloud RANs), ultra-dense networks, device-to-device (D2D) communication, wireless backhaul, moving networks, cooperative communication, Coordinated Multi-Points (CoMP), and received-interference cancelation, have been developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet-of-Things (IoT) network that exchanges and processes information between distributed elements such as objects. IoE technology in which a big data processing technology via a connection with a cloud server or the like is combined with the IoT technology has also emerged. In order to implement IoT, technical factors, such as sensing technology, wired/wireless communication, network infrastructure, service-interface technology, and security technology are required, and research on technologies, such as a sensor network, machine-to-machine (M2M) communication, machine-type communication (MTC), and the like for connection between objects has recently been conducted. In an IoT environment, via collection and analysis of data generated from connected objects, an intelligent information technology (IT) service to create new value for peoples' lives may be provided. IoT may be applied to various fields, such as smart homes, smart buildings, smart cities, smart cars or connected cars, smart grids, health care, smart home appliances, or high-tech medical services, via the convergence and combination of existing IT and various industries.

Accordingly, various attempts are being made to apply 5G communication systems to IoT networks. For example, technologies such as a sensor network, M2M communication, and MTC are implemented by beamforming, MIMO, or array antenna schemes. The application of cloud RAN as the big data processing technology described above may be an example of convergence of 5G communication technology and IoT technology.

As it is now possible to provide various services according to the development of wireless communication systems, there is a need for a method for seamlessly providing the services.

SUMMARY

Based on the above discussion, the present disclosure provides a device and method for transmitting and receiving data in a wireless communication system.

In addition, the present disclosure provides a device and method for performing an operation for prioritization of radio resource by random access in logical channel-based prioritization in a wireless communication system.

DETAILED DESCRIPTION

Figure 1:
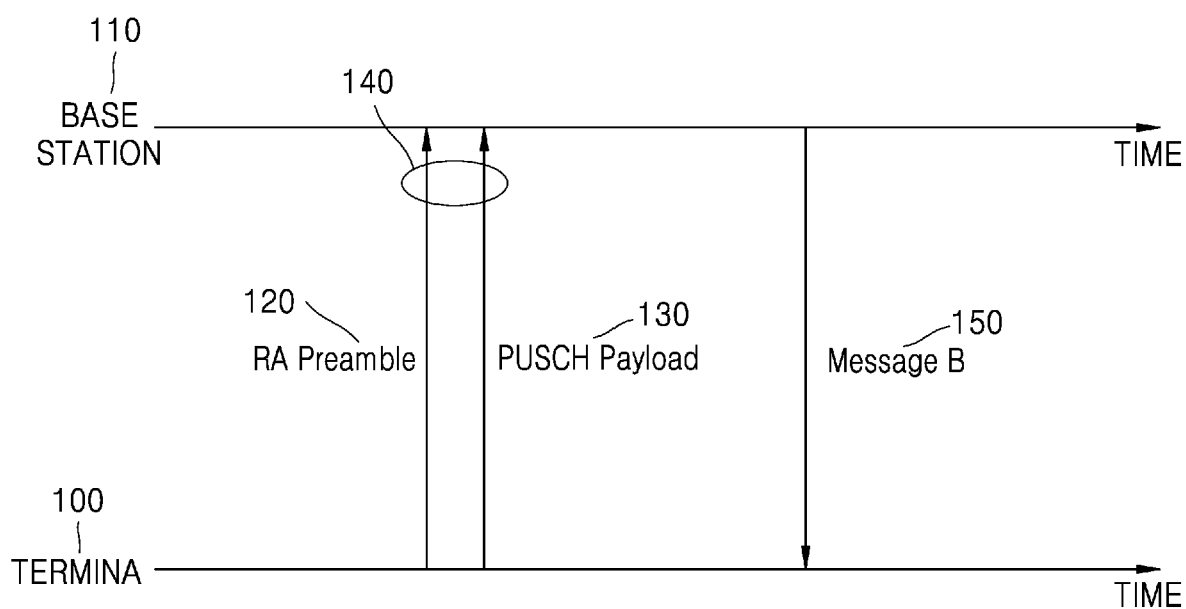
FIG. 1 is a diagram illustrating an operation, performed by a terminal, of performing two-step random access to a base station in a wireless communication system, according to an embodiment of the present disclosure.

According to an embodiment of the present disclosure, an operation method of a terminal in a wireless communication system may include, in case that transmission of a scheduling request (SR) is pending and logical channel-based prioritization is configured for a medium access control (MAC) entity of the terminal, identifying whether a physical uplink control channel (PUCCH) resource associated with transmission of the SR overlaps with a physical uplink shared channel (PUSCH) resource associated with transmission of a message A in a time domain, in case that the PUCCH resource associated with the transmission of the SR does not overlap with the PUSCH resource associated with the transmission of the message A, identifying whether the PUCCH resource associated with the transmission of the SR overlaps with a PUSCH resource associated with uplink data in the time domain, and in case that the PUCCH resource associated with the transmission of the SR overlaps with the PUSCH resource associated with the uplink data, transmitting the SR or the uplink data to a base station by comparing a priority of the PUCCH resource associated with the transmission of the SR with a priority of the PUSCH resource associated with the uplink data.

According to an embodiment of the present disclosure, a terminal in a wireless communication system may include a transceiver, and at least one processor configured to, in case that transmission of a scheduling request (SR) is pending and logical channel-based prioritization is configured for a medium access control (MAC) entity of the terminal, identify whether a physical uplink control channel (PUCCH) resource associated with transmission of the SR overlaps with a physical uplink shared channel (PUSCH) resource associated with transmission of a message A in a time domain, in case that the PUCCH resource associated with the transmission of the SR does not overlap with the PUSCH resource associated with the transmission of the message A, identify whether the PUCCH resource associated with the transmission of the SR overlaps with a PUSCH resource associated with uplink data in the time domain, and in case that the PUCCH resource associated with the transmission of the SR overlaps with the PUSCH resource associated with the uplink data, transmit the SR or the uplink data to a base station by comparing a priority of the PUCCH resource associated with the transmission of the SR with a priority of the PUSCH resource associated with the uplink data.

Hereinafter, embodiments of the present disclosure are described in detail with reference to the accompanying drawings. In addition, in describing the present disclosure, when the detailed description of a relevant known function or configuration is determined to unnecessarily obscure the gist of the present disclosure, the detailed description thereof will be omitted. Also, the terms as used herein are those defined by taking into account functions in the present disclosure, and may vary depending on the intention of users or operators, precedents, or the like. Therefore, their definitions should be made based on the description throughout the present specification.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, rather, these embodiments are provided such that the present disclosure will be thorough and complete, and will fully convey the concept of the present disclosure to those of ordinary skill in the art, and the present disclosure will be defined only by the concept of the claims. Like reference numerals denote like elements throughout the specification.

Here, it could be understood that each block in processing flowchart drawings and combinations of flowchart drawings may be performed by computer program instructions. These computer program instructions may be loaded in a processor of a general-purpose computer, a particular-purpose computer, or other programmable data processing equipment, and thus, the instructions performed by a processor of a computer or other programmable data processing equipment may generate a means configured to perform functions described in flowchart block(s). These computer program instructions may also be stored in a computer-usable or computer-read able memory capable of orienting a computer or other programmable data processing equipment to implement a function in a particular mode, and thus, the instructions stored in the computer-usable or computer-readable memory may also produce a production item involving an instruction means configured to perform a function described in flowchart block(s). These computer program instructions may also be loaded in a computer or other programmable data processing equipment, and thus, a computer-executable process may also be generated by performing a series of operation steps on the computer or the other programmable data processing equipment so that the instructions executed in the computer or the other programmable data processing equipment provide steps for executing functions described in flowchart block(s).

In addition, each block may indicate a portion of a module, a segment, or a code including one or more executable instructions for executing particular logical function(s). Also, in several substitutional embodiments, functions described in blocks may also be out of a sequence. For example, two consecutively shown blocks may be substantially performed at the same time in fact, or the blocks may be sometimes performed in a reverse order according to a corresponding function.

The term '... unit' used in the embodiments indicates a component including software or hardware, such as a field-programmable gate array (FPGA) or an application-specific integrated circuit (ASIC), and the '... unit' performs certain roles. However, the '... unit' does not always have a meaning limited to software or hardware. The '... unit' may be configured either to be stored in an addressable storage medium or to execute one or more processors. Therefore, for example, the '... unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and '... units' may be combined into a smaller number of components and '... units' or be further divided into additional components and '... units'. In addition, components and '... units' may be implemented to reproduce one or more central processing units (CPUs) inside a device or a security multimedia card. Also, in an embodiment, the '... unit' may include one or more processors.

In describing the present disclosure, when the detailed description of a relevant known function or configuration is determined to unnecessarily obscure the gist of the present disclosure, the detailed description thereof will be omitted. Hereinafter, embodiments of the present disclosure will be described in detail with reference to the accompanying drawings.

As used herein, terms for identifying access nodes, terms referring to network entities, terms referring to messages, terms referring to interfaces between network entities, terms referring to a variety of identification information, and the like are exemplified for convenience of description. Accordingly, the present disclosure is not limited to the terms used herein, and may use other terms having technically identical meaning.

In the following description, the terms 'physical channel' and 'signal' may be interchangeably used with the term 'data' or 'control signal'. For example, the term 'physical downlink shared channel (PDSCH)' refers to a physical channel on which data is transmitted, but the term 'PDSCH' may also be used to indicate data. That is, in the present disclosure, the expression 'transmit a physical channel' may be understood as the same meaning as the expression 'transmit data or a signal on a physical channel'.

Throughout the present disclosure, the term 'higher layer signaling' refers to a method of transmitting a signal to a terminal from a base station by using a downlink data channel of a physical layer or to the base station from the terminal by using an uplink data channel of the physical layer. The term 'higher layer signaling' may be understood as radio resource control (RRC) signaling or a medium access control (MAC) control element (CE).

In the following description, the present disclosure will be described with terms and names defined in the 3$^{rd}$ Generation Partnership Project (3GPP) Long-Term Evolution (LTE) standards, for convenience of description. However, the present disclosure is not limited by the terms and names, and may be applied in the same way to systems that conform other standards. In particular, the present disclosure may be applied to 3GPP New Radio (NR), which is a 5$^{th}$ Generation mobile communication standard. In the present disclosure, for convenience of description, the terms 'eNB' and 'gNB' may be interchangeably used. That is, a base station mentioned as an eNB may refer to a gNB. In addition, the term 'terminal' may represent cellular phones, narrowband internet-of-Things (NB-IoT) devices, sensors, and other wireless communication devices.

Hereinafter, a base station (BS) refers to an entity that allocates resources to a terminal, and may be at least one of a gNode B, an eNode B, a Node B, a radio access unit, a BS controller, or a node on a network. A terminal may include a user equipment (UE), a mobile station (MS), a cellular phone, a smart phone, a computer, or a multimedia system capable of performing a communication function. However, the present disclosure is not limited thereto.

The present disclosure relates to a method and device for prioritization of uplink grant by random access in logical channel-based prioritization.

FIG. 1 is a diagram illustrating an operation, performed by a terminal, of performing two-step random access to a BS in a wireless communication system, according to an embodiment of the present disclosure.

Referring to FIG. 1, when a terminal needs to perform initial access, or according to uplink synchronization or the need of a BS, the BS may indicate the terminal to perform random access (RA). Alternatively, the terminal may determine to perform RA for the purpose of initial access or the like. When a terminal 100 needs to perform RA to a BS 110 for at least one of the above-described reasons for performing RA, the terminal may transmit an RA preamble 120 and a physical uplink shared channel (PUSCH) payload 130 together to the BS.

According to an embodiment, in a two-step RA operation, an RA preamble transmitted by the terminal and a PUSCH payload, which is a message including important information that the terminal needs to transmit to the BS, may be collectively referred to as a message A (MSGA) 140. That is, a MSGA may include an RA preamble and a PUSCH payload. A message transmitted in the PUSCH payload of the MSGA may refer to an MAC protocol data unit (PDU) stored in a buffer of the MSGA.

According to an embodiment, an RA preamble transmitted by a terminal to a BS may refer to an RA preamble preconfigured by the BS. In addition, a PUSCH resource may refer to an uplink radio resource preconfigured by a BS. As described above, RA using a preconfigured RA preamble and uplink radio resource may be referred to as contention-free RA (CFRA).

Alternatively, terminals performing RA may share RA preambles and PUSCH resources, and a terminal may use one of at least one shared RA preamble and a PUSCH resource corresponding to the RA preamble. Such RA may be referred to as contention-based RA (CBRA). A type of RA to be used may be configured by a BS for a terminal. In addition, when there is no RA preamble available to the terminal, the terminal may perform CBRA.

According to an embodiment, when a terminal transmits a MSGA, a BS having received the MSGA may calculate an arrival time of an RA preamble to adjust a timing advance (TA) value indicating a time point at which the terminal starts uplink transmission. In addition, the BS may check that the terminal having transmitted the MSGA has completed an RA operation, and transmit, to the terminal that has failed to transmit the RA preamble, a message B (MSGB) 150 to indicate the terminal to perform again the RA operation.

According to an embodiment, when the terminal transmits the MSGA 140, the terminal may transmit, as the MSGA 140, a MAC PDU that is in the buffer of the message A. In addition, the MAC PDU to be transmitted by the terminal may be associated with the RA operation, and may be regarded as more important information than general data. When the RA operation using the above-described MAC PDU and the like associated with the RA operation fails, the performance of the terminal may immediately deteriorate, such as connection failure or a decrease in reception rate. Therefore, the terminal needs to preferentially transmit the above-described MAC PDU and the like associated with the RA operation. However, a MAC PDU and the like associated with an RA operation may not always be transmitted with the highest priority, and according to an embodiment of the present disclosure, they may have a lower priority than that of high-priority data for an ultra-reliable and low-latency communication (URLLC) service.

Figure 2:
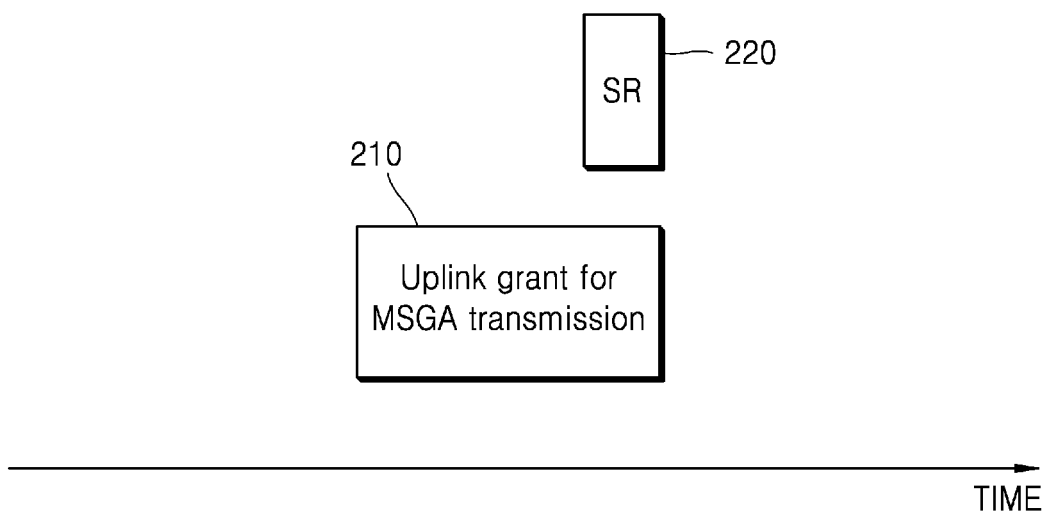
FIG. 2 is a diagram illustrating a scenario in which an uplink radio resource for transmission of a message A overlaps, on the time axis, a resource for a scheduling request (SR) message in a wireless communication system, according to an embodiment of the present disclosure.

FIG. 2 is a diagram illustrating a scenario in which an uplink radio resource for transmission of a MSGA overlaps, on the time axis, a resource for a scheduling request (SR) message in a wireless communication system, according to an embodiment of the present disclosure.

Referring to FIG. 2, in a two-step RA operation, an RA operation, performed by a terminal, including transmitting an RA preamble and transmitting a PUSCH payload by using a PUSCH resource corresponding to the RA preamble may be triggered by the terminal. Alternatively, in CBRA, an RA preamble and a PUSCH resource corresponding to the RA preamble may be shared by a plurality of terminals. As described above, because the RA operation is triggered by the terminal or the RA preamble and the PUSCH resource corresponding to the RA preamble are shared by the plurality of terminals, it may be difficult for a BS to determine which terminal has transmitted the RA preamble and the PUSCH resource. For this reason, the BS may allocate the terminal another physical uplink control channel (PUCCH) resource for SR message. In addition, such a PUCCH resource for an SR message may be allocated overlapping, on the time axis or on the time axis and the frequency axis, an uplink resource for transmission of a MSGA. According to an embodiment, in the present disclosure, a PUCCH resource for an SR message may be referred to as a resource for an SR message, which may be referred to as an SR resource.

In an embodiment, a PUSCH resource for a MSGA may correspond to an uplink shared channel (UL-SCH) in a transport channel. A resource allocated to a UL-SCH may be referred to as an uplink radio resource, which may be referred to as an uplink grant.

FIG. 2 illustrates an example in which an uplink radio resource (i.e., an uplink grant for MSGA transmission) 210 for transmitting a MSGA and a PUCCH resource 220 for SR transmission overlap each other on the time axis. When only one uplink radio resource needs to be transmitted in a single cell at the same time point, the terminal may select one uplink radio resource arbitrarily or according to a preset rule, and perform transmission. However, here, the uplink radio resource for transmitting the MSGA may be used only when the MSGA actual occurs and thus an RA preamble is transmitted. Therefore, in the present disclosure, that there is an uplink resource for transmitting a MSGA may mean that the message A actually occurs and thus the uplink resource for transmitting the MSGA is used. Similarly, a PUCCH resource for SR transmission may be used only when the SR transmission actually occurs and thus is performed. Therefore, in the present disclosure, that there is a PUCCH resource for SR transmission may mean that the SR transmission is triggered and there is an SR to be transmitted by using a PUCCH for the SR transmission. In this case, because the PUCCH on which the SR is transmitted and the PUSCH on which the MSGA is transmitted cannot be transmitted simultaneously at the same time point in a MAC entity, the terminal needs to select one of the resource for transmitting the SR and the resource for transmitting the MSGA, and perform transmission.

In an embodiment, when one of the resource for transmitting the SR and a resource for transmitting the MSGA is selected and the selected resource is transmitted, the selected radio resource may refer to a prioritized resource. On the contrary, the unselected resource may refer to a de-prioritized resource. Which resource to consider as a prioritized resource and which resource to consider as a de-prioritized resource may be determined based on a priority value defined for each resource.

Figure 3:
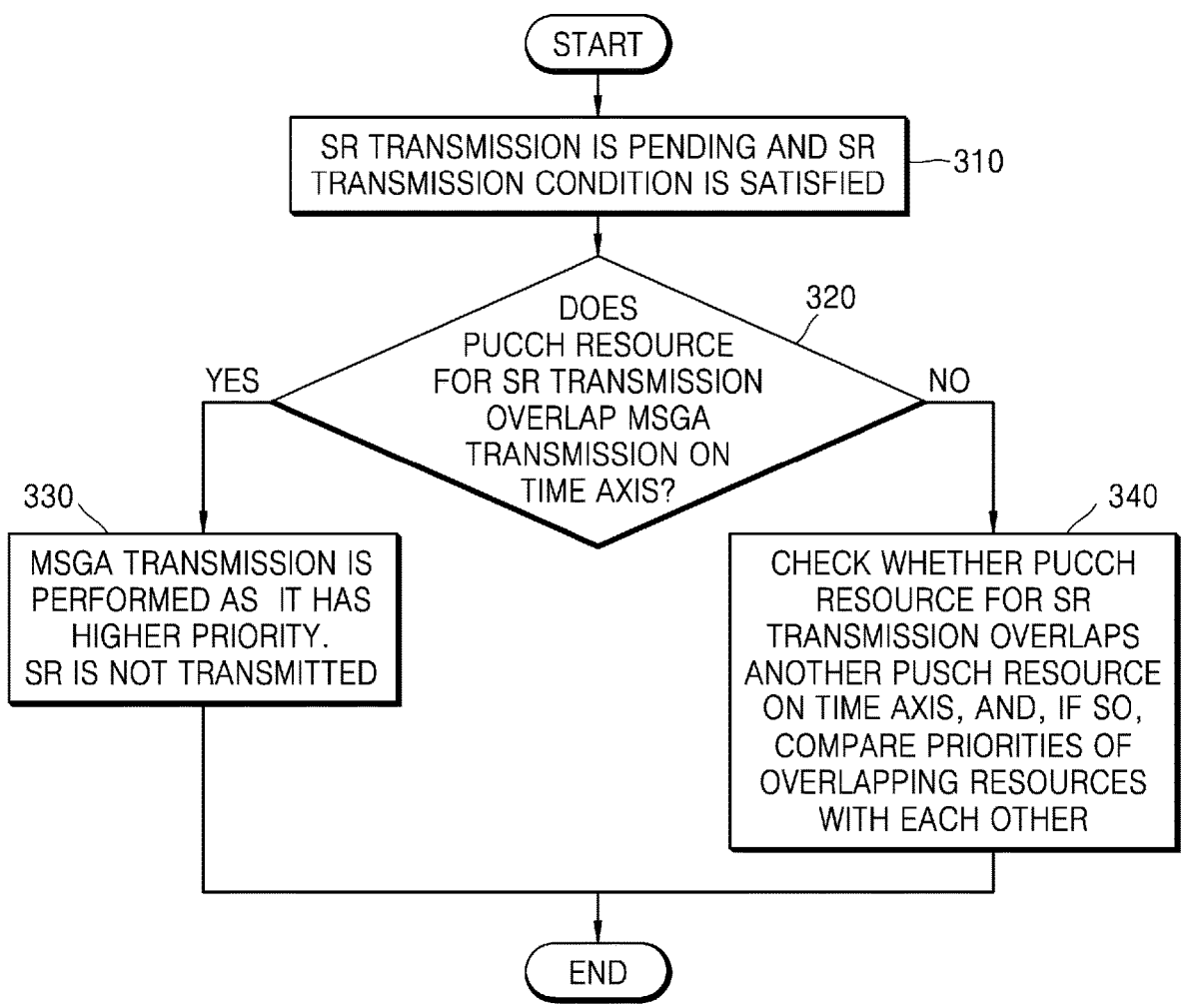
FIG. 3 is a flowchart illustrating an operation of prioritizing a resource for an SR message and a resource for a message A in a logical channel-based prioritization operation in a wireless communication system, according to an embodiment of the present disclosure.

In an embodiment, when SR transmission occurs and a PUCCH resource is used, the priority for the SR transmission may be determined based on the priority of a logical channel that triggered the SR. According to an embodiment, the priority of a PUSCH for a MSGA (or an uplink radio resource for the MSGA) may be determined as a predefined value. In an embodiment, the priority of the PUSCH for the MSGA may always be set higher than the priority of a logical channel for data. As described above, an operation of selecting a resource by defining prioritized resources and de-prioritized uplink resources based on the priority of each resource may be referred to as logical channel-based prioritization or logical channel priority-based prioritization. With reference to FIG. 3, a method of determining whether a resource for a MSGA is a prioritized resource or a de-prioritized resource in such a logical channel-based prioritization operation, and performing transmission will be described.

FIG. 3 is a flowchart illustrating an operation of prioritizing a resource for an SR message and a resource for a MSGA in a logical channel-based prioritization operation in a wireless communication system, according to an embodiment of the present disclosure.

As described above with reference to FIG. 2, a PUCCH resource on which an SR may be transmitted as SR transmission occurs, and a PUSCH resource for a MSGA may overlap each other on the time axis or on the time axis and the frequency axis. Such a scenario may occur when a logical channel-based prioritization operation is configured. However, the embodiment of FIG. 3 may be performed regardless of whether a logical channel-based prioritization operation is configured. In the embodiment illustrated FIG. 3, a scenario is described in which, when MSGA transmission occurs and thus PUSCH transmission for the MSGA transmission exists, the MSGA transmission always has a higher priority than that of SR transmission. Therefore, when the transmission of a MSGA occurs, the terminal may transmit the MS GA by using a PUSCH resource for the MS GA regardless of the presence or absence of SR transmission.

However, in an embodiment, when a resource for SR transmission overlaps a PUSCH resource for MSGA transmission, an SR transmission procedure needs to be stopped.

Referring to FIG. 3, in operation 310, it may be assumed that SR transmission is pending and an SR transmission condition is satisfied. According to an embodiment, the SR transmission condition may be that, when a triggered SR is pending, an MAC entity has an SR transmission occasion of a valid PUCCH resource for a configuration of the pending SR, the SR prohibit timer does not operate during the SR transmission occasion, and a PUCCH resource for the SR transmission occasion does not overlap a measurement gap.

In operation 320, when logical channel-based prioritization is configured, the terminal may check whether the PUCCH resource for the SR transmission overlaps the MSGA transmission on the time axis. In an embodiment, whether the PUCCH resource for the SR transmission overlaps the MSGA transmission on the time axis has the same meaning as whether the PUCCH resource for the SR transmission overlaps a PUSCH time interval of the MSGA transmission that actually occurred. When the PUCCH resource for the SR transmission overlaps the MSGA transmission on the time axis, the MSGA transmission may have priority over the SR transmission. Accordingly, the SR transmission cannot be performed in an SR transmission occasion that overlaps the MSGA transmission. Therefore, an operation for SR transmission may be stopped in an SR transmission occasion that overlaps MSGA transmission. In an embodiment, when the PUCCH resource for the SR transmission overlaps the MSGA transmission on the time axis, operation 330 may be performed, and when the PUCCH resource for the SR transmission does not overlap the MSGA transmission on the time axis, operation 340 may be performed.

In operation 330, when the PUCCH resource for the SR transmission overlaps the MSGA transmission on the time axis, that is, when the PUCCH resource for the SR transmission overlaps the PUSCH resource for the MSGA transmission on the time axis, transmission of the MSGA may have priority over the SR transmission. Accordingly, the message A may be transmitted. In addition, the SR may not be transmitted. Accordingly, the SR transmission may not be indicated to a lower layer.

In operation 340, when the PUCCH resource for the SR transmission does not overlap the MSGA transmission on the time axis, that is, when the PUCCH resource for the SR transmission does not overlap the PUSCH resource for the MSGA transmission on the time axis, the terminal may check whether the PUCCH resource for the SR transmission overlaps another PUSCH resource on the time axis. When the PUCCH resource for the SR transmission overlaps another PUSCH resource on the time axis, the terminal may compare the priorities of the overlapping resources with each other. For example, the terminal may determine whether to perform the SR transmission according to a prioritization operation defined in the logical channel-based prioritization. In this case, the priority of the SR transmission may refer to the priority of a logical channel that has triggered the SR. When the SR transmission is triggered by a MAC CE, the priority of the SR transmission may be lower than the priority of any logical channel for data. In this way, in a logical channel-based prioritization operation, the terminal may transmit an SR or data by comparing the priorities of a resource for SR transmission and other overlapping PUSCH resources (i.e., uplink radio resources) on the time axis, and prioritizing the resource having a higher priority.

Figure 4:
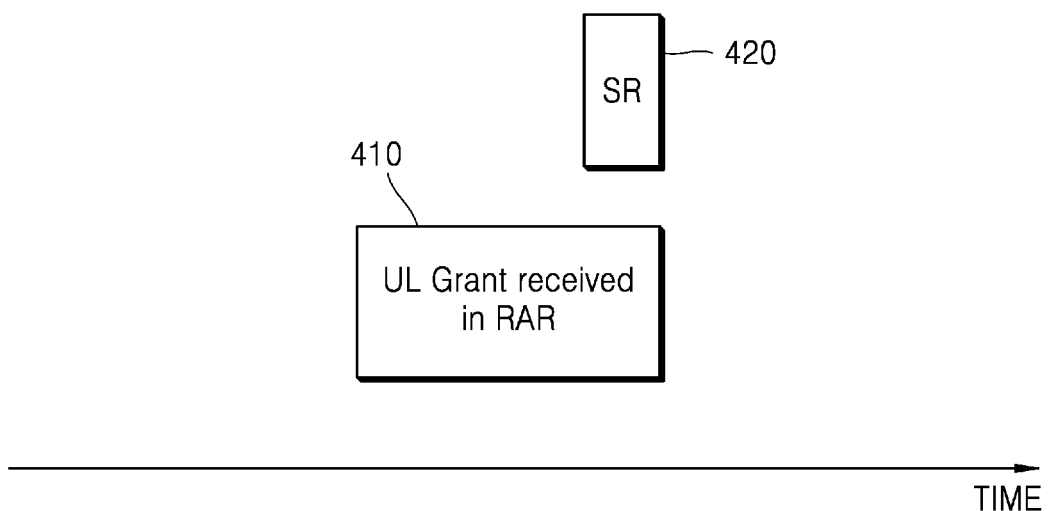
FIG. 4 is a diagram illustrating a scenario in which an uplink radio resource received in a random access response (RAR) overlaps, on the time axis, a resource for an SR message in a wireless communication system, according to an embodiment of the present disclosure.

FIG. 4 is a diagram illustrating a scenario in which an uplink radio resource received in RA response (RAR) overlaps, on the time axis, a resource for an SR message in a wireless communication system, according to an embodiment of the present disclosure.

In a four-step RA operation to be described below with reference to FIG. 10, after a terminal transmits an RA preamble, a BS may transmit an RAR message so as to allocate the terminal a resource for transmitting a message 3. Because an RA operation is triggered by a terminal, or in CBRA, an RA preamble is shared by a plurality of terminals, it may be difficult for a BS to determine which terminal has transmitted the RA preamble. For this reason, the BS may allocate the terminal a PUCCH resource for another SR message, and the PUCCH resource for the SR message, that is, the SR resource, may be allocated overlapping the uplink radio resource received in RAR on the time axis or on the time axis and the frequency axis.

In an embodiment, a PUSCH resource for the uplink radio resource received in RAR may correspond to a UL-SCH in a transport channel. A resource allocated to a UL-SCH may be referred to as an uplink radio resource, which may be referred to as an uplink grant. For example, an uplink radio resource received in RAR may be referred to as a UL grant received in RAR.

FIG. 4 illustrates an example in which an uplink radio resource 410 received in RAR (i.e., UL grant received in RAR) and a PUCCH resource 420 for SR transmission overlap each other on the time axis. When a MAC PDU is stored in a message 3 buffer, the uplink radio resource received in RAR may be used to transmit the MAC PDU stored in the message 3 buffer. When only one uplink radio resource needs to be transmitted in a single cell at the same time point, the terminal may select one uplink radio resource arbitrarily or according to a preset rule, and perform transmission. However, a PUCCH resource for SR transmission may be used only when the SR transmission actually occurs and thus is performed. In the present disclosure, it may be assumed that SR transmission is triggered and thus there is an SR to be transmitted by using a PUCCH for the SR transmission. In this case, because the PUCCH on which the SR is transmitted and the PUSCH corresponding to the uplink radio resource received in RAR cannot be simultaneously transmitted within a MAC entity at the same time point, the terminal needs to select one of the resource for the SR transmission and the uplink radio resource received in RAR, and perform transmission.

In an embodiment, when one of the resource for the SR transmission and the uplink radio resource received in RAR is selected and the selected resource is transmitted, the selected radio resource may refer to a prioritized resource. On the contrary, the unselected resource may refer to a de-prioritized resource. Which resource to consider as a prioritized resource and which resource to consider as a de-prioritized resource may be determined based on a priority value defined for each resource.

In an embodiment, when SR transmission occurs and a PUCCH resource is used, the priority for the SR transmission may be determined based on the priority of a logical channel that triggered the SR. According to an embodiment, the priority of the uplink radio resource received in RAR may be determined as a predefined value. In an embodiment, the priority of the uplink radio resource received in RAR may always be set higher than the priority of a logical channel for data. As described above, an operation of selecting a resource by defining prioritized resources and de-prioritized uplink resources based on the priority of each resource may be referred to as logical channel-based prioritization or logical channel priority-based prioritization. A method of determining whether an uplink radio resource received in RAR is a prioritized resource or a de-prioritized resource in such a logical channel-based prioritization operation, and performing transmission will be described with reference to FIG. 5.

Figure 5:
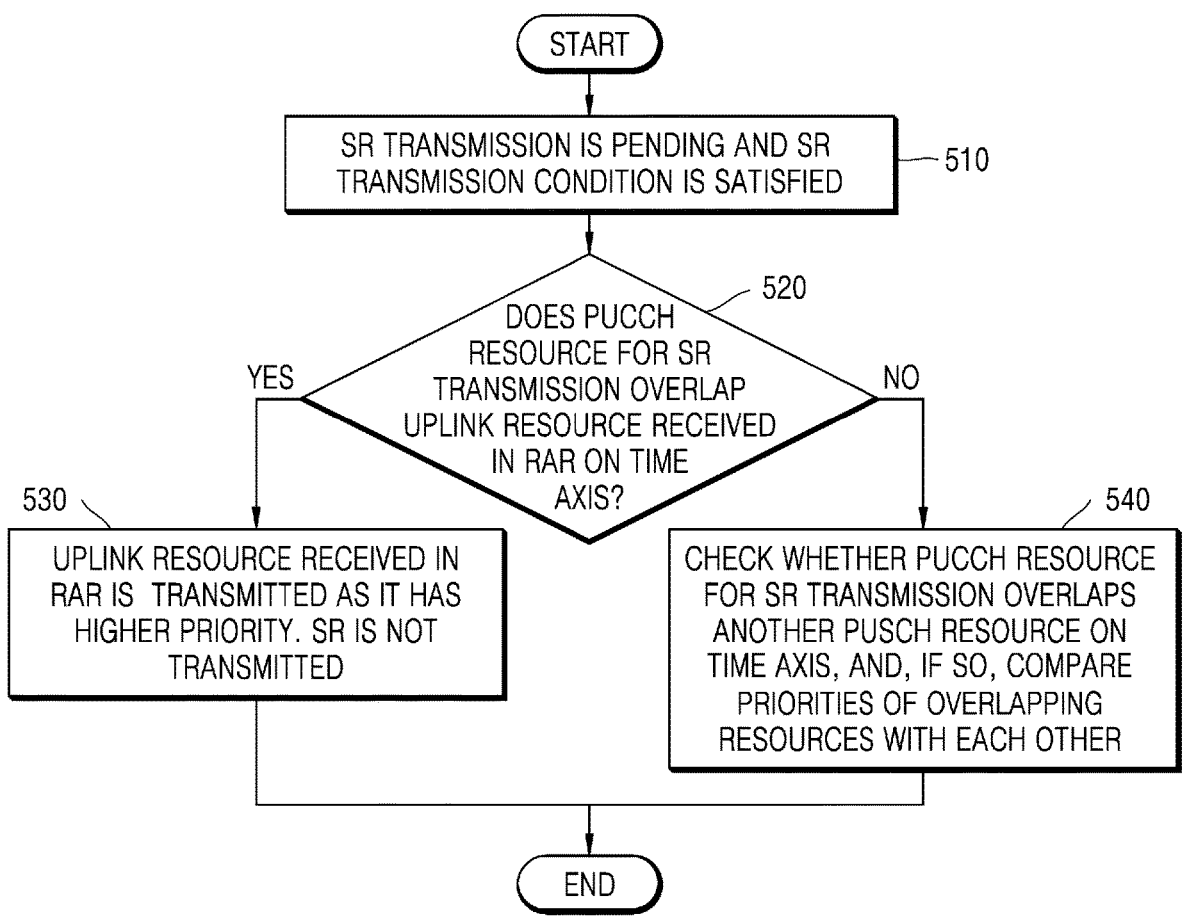
FIG. 5 is a flowchart illustrating an operation of prioritizing a resource for an SR message and an uplink radio resource received in RAR in a logical channel-based prioritization operation in a wireless communication system, according to an embodiment of the present disclosure.

FIG. 5 is a flowchart illustrating an operation of prioritizing a resource for an SR message and an uplink radio resource received in RAR in a logical channel-based prioritization operation in a wireless communication system, according to an embodiment of the present disclosure.

As described above with reference to FIG. 4, a PUCCH resource on which an SR may be transmitted as SR transmission occurs, and an uplink radio resource received in RAR (e.g., a PUSCH resource) may overlap each other on the time axis or on the time axis and the frequency axis. Such a scenario may occur when a logical channel-based prioritization operation is configured. However, the embodiment of FIG. 5 may be performed regardless of whether a logical channel-based prioritization operation is configured. In the embodiment illustrated in FIG. 5, a scenario is described in which, when a terminal is allocated, by a BS, an uplink radio resource received in RAR, data transmission through the uplink radio resource received in RAR always has a higher priority than that of SR transmission. Therefore, when an uplink radio resource received in RAR occurs, the terminal may transmit data by using the uplink radio resource received in RAR regardless of the presence or absence of SR transmission.

However, in an embodiment, when the resource for the SR transmission overlaps the uplink radio resource received in RAR, the SR transmission procedure needs to be stopped.

Referring to FIG. 5, in operation 510, it may be assumed that SR transmission is pending and an SR transmission condition is satisfied. According to an embodiment, the SR transmission condition may be that, when a triggered SR is pending, an MAC entity has an SR transmission occasion of a valid PUCCH resource for a configuration of the pending SR, the SR prohibit timer does not operate during the SR transmission occasion, and a PUCCH resource for the SR transmission occasion does not overlap a measurement gap.

In operation 520, when logical channel-based prioritization is configured, the terminal may check whether the PUCCH resource for the SR transmission overlaps the uplink radio resource received in RAR on the time axis. When the PUCCH resource for the SR transmission overlaps the uplink radio resource received in RAR on the time axis, the uplink radio resource received in RAR may have priority over the PUCCH resource for the SR transmission. Accordingly, the SR transmission cannot be performed in an SR transmission occasion that overlaps the uplink radio resource received in RAR. Therefore, an operation for the SR transmission may be stopped in the SR transmission occasion that overlaps the uplink radio resource received in RAR. In an embodiment, when the PUCCH resource for the SR transmission overlaps the uplink radio resource received in RAR on the time axis, operation 530 may be performed, and when the PUCCH resource for the SR transmission does not overlap the uplink radio resource received in RAR on the time axis, operation 540 may be performed.

In operation 530, when the PUCCH resource for the SR transmission overlaps the uplink radio resource received in RAR on the time axis, the uplink resource received in RAR may have priority over the PUCCH resource for the SR transmission. Accordingly, data may be transmitted on the uplink resource received in RAR. In addition, the SR may not be transmitted. Accordingly, the SR transmission may not be indicated to a lower layer.

In operation 540, when the PUCCH resource for the SR transmission does not overlap the uplink radio resource received in RAR on the time axis, the terminal may check whether the PUCCH resource for the SR transmission overlaps another PUSCH resource on the time axis. When the PUCCH resource for the SR transmission overlaps another PUSCH resource on the time axis, the terminal may compare the priorities of the overlapping resources with each other. For example, the terminal may determine whether to perform the SR transmission according to a prioritization operation defined in the logical channel-based prioritization. In this case, the priority of the SR transmission may refer to the priority of a logical channel that has triggered the SR. When the SR transmission is triggered by a MAC CE, the priority of the SR transmission may be lower than the priority of any logical channel for data. In this way, in a logical channel-based prioritization operation, the terminal may transmit an SR or data by comparing the priorities of a resource for SR transmission and other overlapping PUSCH resources (i.e., uplink radio resources) on the time axis, and prioritizing the resource having a higher priority.

Figure 6:
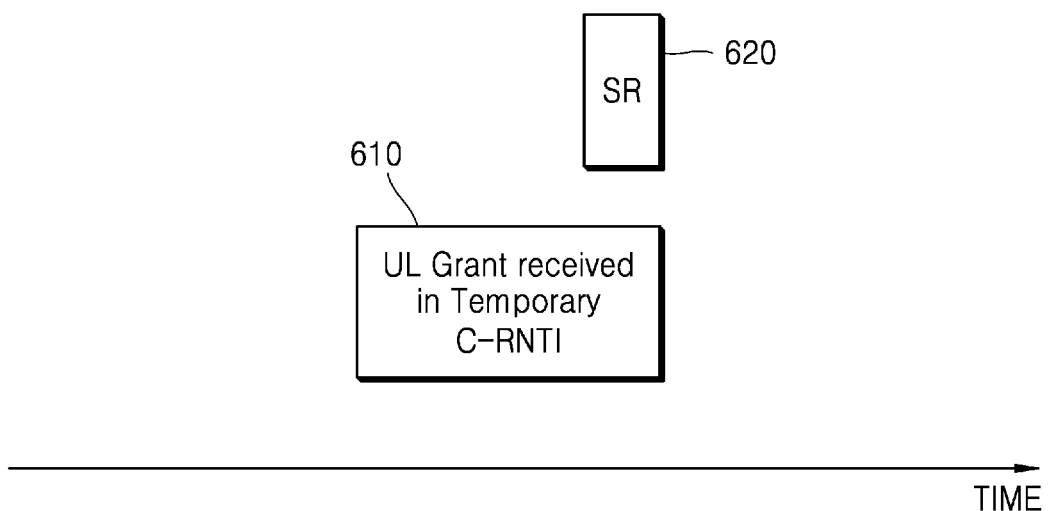
FIG. 6 is a diagram illustrating a scenario in which an uplink radio resource allocated with a temporary cell radio network temporary identifier (C-RNTI) overlaps a resource for an SR message on a time axis in a wireless communication system, according to an embodiment of the present disclosure.

FIG. 6 is a diagram illustrating a scenario in which an uplink radio resource allocated with a temporary cell radio network temporary identifier (C-RNTI) overlaps a resource for an SR message on a time axis in a wireless communication system, according to an embodiment of the present disclosure.

After a terminal transmits a message 3 in a four-step RA operation to be described below with reference to FIG. 10, a BS may allocate an uplink radio resource via a temporary C-RNTI in order to indicate retransmission of the message. Because an RA operation is triggered by a terminal, or in CBRA, an RA preamble is shared by a plurality of terminals, it may be difficult for a BS to determine which terminal has transmitted the RA preamble. For this reason, the BS may allocate the terminal a PUCCH resource for another SR message, and the PUCCH resource for the SR message, that is, the SR resource, may be allocated overlapping the uplink radio resource allocated with the temporary C-RNTI on the time axis or on the time axis and the frequency axis.

In an embodiment, a PUSCH resource for the uplink radio resource allocated with the temporary C-RNTI may correspond to a UL-SCH in a transport channel. A resource allocated to a UL-SCH may be referred to as an uplink radio resource, which may be referred to as an uplink grant. For example, an uplink radio resource allocated with a temporary C-RNTI may be referred to as a UL grant received in temporary C-RNTI.

FIG. 6 illustrates an example in which an uplink radio resource 610 allocated with a temporary C-RNTI (i.e., a UL grant received in temporary C-RNTI) and a PUCCH resource 620 for SR transmission overlap each other on the time axis. When only one uplink radio resource needs to be transmitted in a single cell at the same time point, the terminal may select one uplink radio resource arbitrarily or according to a preset rule, and perform transmission. However, a PUCCH resource for SR transmission may be used only when the SR transmission actually occurs and thus is performed. In the present disclosure, it may be assumed that SR transmission is triggered and thus there is an SR to be transmitted by using a PUCCH for the SR transmission. In this case, because the PUCCH on which the SR is transmitted and the PUSCH corresponding to the uplink radio resource received in temporary C-RNTI cannot be simultaneously transmitted within a MAC entity at the same time point, the terminal needs to select one of the resource for the SR transmission and the uplink radio resource received in temporary C-RNTI, and perform transmission.

In an embodiment, when one of the resource for the SR transmission and the uplink radio resource received in temporary C-RNTI is selected and the selected resource is transmitted, the selected radio resource may refer to a prioritized resource. On the contrary, the unselected resource may refer to a de-prioritized resource. Which resource to consider as a prioritized resource and which resource to consider as a de-prioritized resource may be determined based on a priority value defined for each resource.

In an embodiment, when SR transmission occurs and a PUCCH resource is used, the priority for the SR transmission may be determined based on the priority of a logical channel that triggered the SR.

According to an embodiment, the priority of the uplink radio resource allocated with the temporary C-RNTI may be determined as a predefined value. In an embodiment, the priority of the uplink radio resource allocated with the temporary C-RNTI may always be set higher than the priority of a logical channel for data. As described above, an operation of selecting a resource by defining prioritized resources and de-prioritized uplink resources based on the priority of each resource may be referred to as logical channel-based prioritization or logical channel priority-based prioritization. A method of determining whether an uplink radio resource allocated with a temporary C-RNTI is a prioritized resource or a de-prioritized resource in such a logical channel-based prioritization operation, and performing transmission will be described with reference to FIG. 7.

Figure 7:
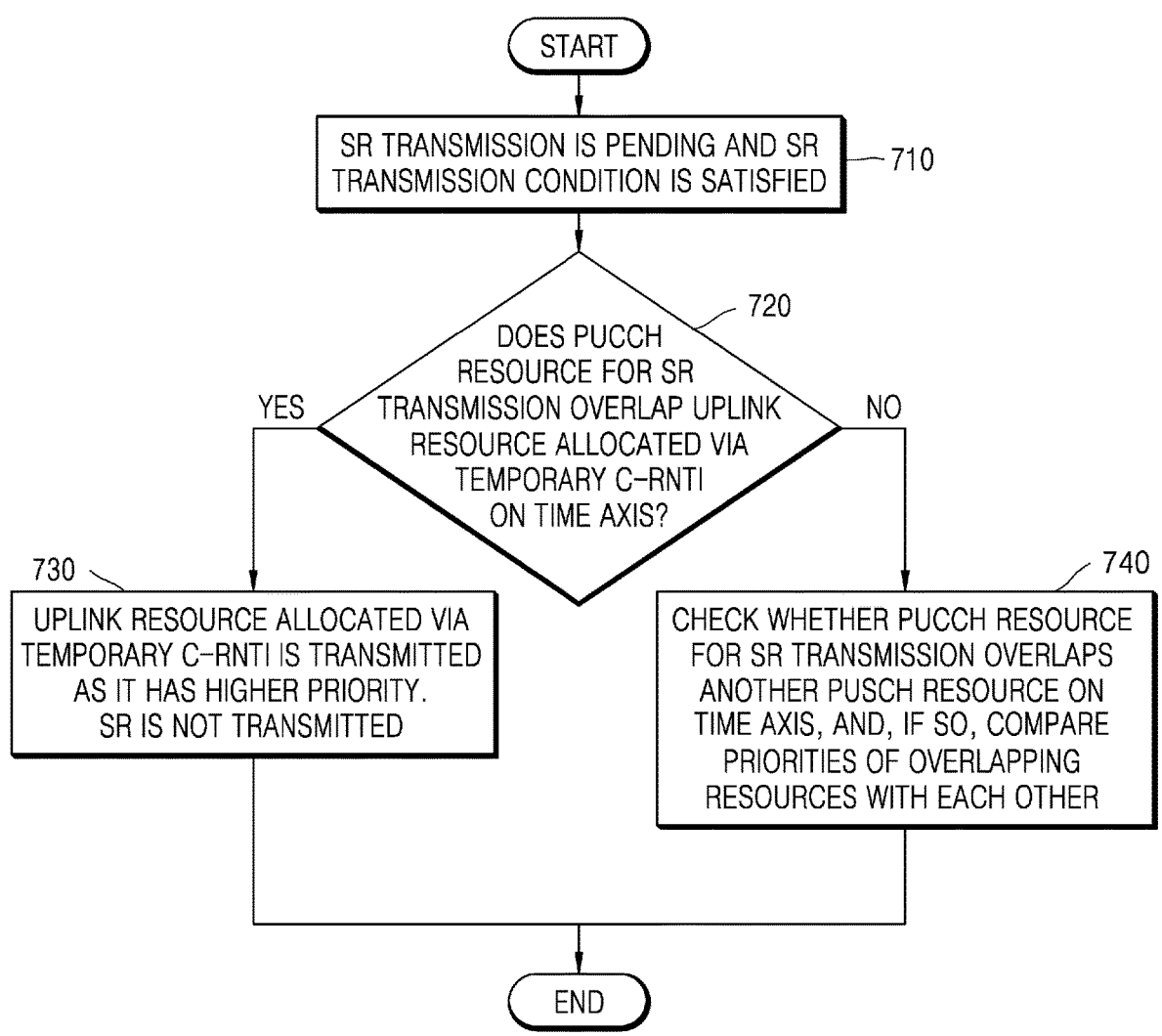
FIG. 7 is a flowchart illustrating an operation of prioritizing a resource for an SR message and an uplink radio resource allocated with a temporary C-RNTI in a logical channel-based prioritization operation in a wireless communication system, according to an embodiment of the present disclosure.

FIG. 7 is a flowchart illustrating an operation of prioritizing a resource for an SR message and an uplink radio resource allocated with a temporary C-RNTI in a logical channel-based prioritization operation in a wireless communication system, according to an embodiment of the present disclosure.

As described above with reference to FIG. 7, a PUCCH resource on which an SR may be transmitted as SR transmission occurs, and an uplink radio resource (e.g., a PUSCH resource) allocated with a temporary C-RNTI may overlap each other on the time axis or on the time axis and the frequency axis. Such a scenario may occur when a logical channel-based prioritization operation is configured. However, the embodiment of FIG. 7 may be performed regardless of whether a logical channel-based prioritization operation is configured. In the embodiment illustrated in FIG. 7, a scenario is described in which, when a terminal is allocated, by a BS, an uplink radio resource allocated with a temporary C-RNTI, data transmission on the uplink radio resource allocated with the temporary C-RNTI always has a higher priority than that of SR transmission. Accordingly, when the uplink radio resource allocated with the temporary C-RNTI occurs, the terminal may transmit data by using the uplink radio resource allocated with the temporary C-RNTI regardless of the presence or absence of SR transmission.

However, in an embodiment, when the resource for the SR transmission overlaps the uplink radio resource allocated with the temporary C-RNTI, the SR transmission procedure needs to be stopped.

Referring to FIG. 7, in operation 710, it may be assumed that SR transmission is pending and an SR transmission condition is satisfied. According to an embodiment, the SR transmission condition may be that, when a triggered SR is pending, an MAC entity has an SR transmission occasion of a valid PUCCH resource for a configuration of the pending SR, the SR prohibit timer does not operate during the SR transmission occasion, and a PUCCH resource for the SR transmission occasion does not overlap a measurement gap.

In operation 720, when logical channel-based prioritization is configured, the terminal may check whether the PUCCH resource for the SR transmission overlaps the uplink radio resource allocated with the temporary C-RNTI on the time axis. When the PUCCH resource for the SR transmission overlaps the uplink radio resource allocated with the temporary C-RNTI on the time axis, the uplink radio resource allocated with the temporary C-RNTI may have priority over the PUCCH resource for the SR transmission. Accordingly, the SR transmission cannot be performed in an SR transmission occasion that overlaps the uplink radio resource allocated with the temporary C-RNTI. Therefore, an operation for the SR transmission may be stopped in the SR transmission occasion that overlaps the uplink radio resource allocated with the temporary C-RNTI. In an embodiment, when the PUCCH resource for the SR transmission overlaps the uplink radio resource allocated with the temporary C-RNTI on the time axis, operation 730 may be performed, and when the PUCCH resource for the SR transmission does not overlap the uplink radio resource allocated with the temporary C-RNTI on the time axis, operation 740 may be performed.

In operation 730, when the PUCCH resource for the SR transmission overlaps the uplink radio resource allocated with the temporary C-RNTI on the time axis, the uplink radio resource allocated with the temporary C-RNTI may have priority over the PUCCH resource for the SR transmission. Accordingly, data may be transmitted on the uplink radio resource allocated with the temporary C-RNTI. In addition, the SR may not be transmitted. Accordingly, the SR transmission may not be indicated to a lower layer.

In operation 740, when the PUCCH resource for the SR transmission does not overlap the uplink radio resource allocated with the temporary C-RNTI on the time axis, the terminal may check whether the PUC CH resource for the SR transmission overlaps another PUSCH resource on the time axis. When the PUCCH resource for the SR transmission overlaps another PUSCH resource on the time axis, the terminal may compare the priorities of the overlapping resources with each other. For example, the terminal may determine whether to perform the SR transmission according to a prioritization operation defined in the logical channel-based prioritization. In this case, the priority of the SR transmission may refer to the priority of a logical channel that has triggered the SR. When the SR transmission is triggered by a MAC CE, the priority of the SR transmission may be lower than the priority of any logical channel for data. In this way, in a logical channel-based prioritization operation, the terminal may transmit an SR or data by comparing the priorities of a resource for SR transmission and other overlapping PUSCH resources (i.e., uplink radio resources) on the time axis.

Figure 8:
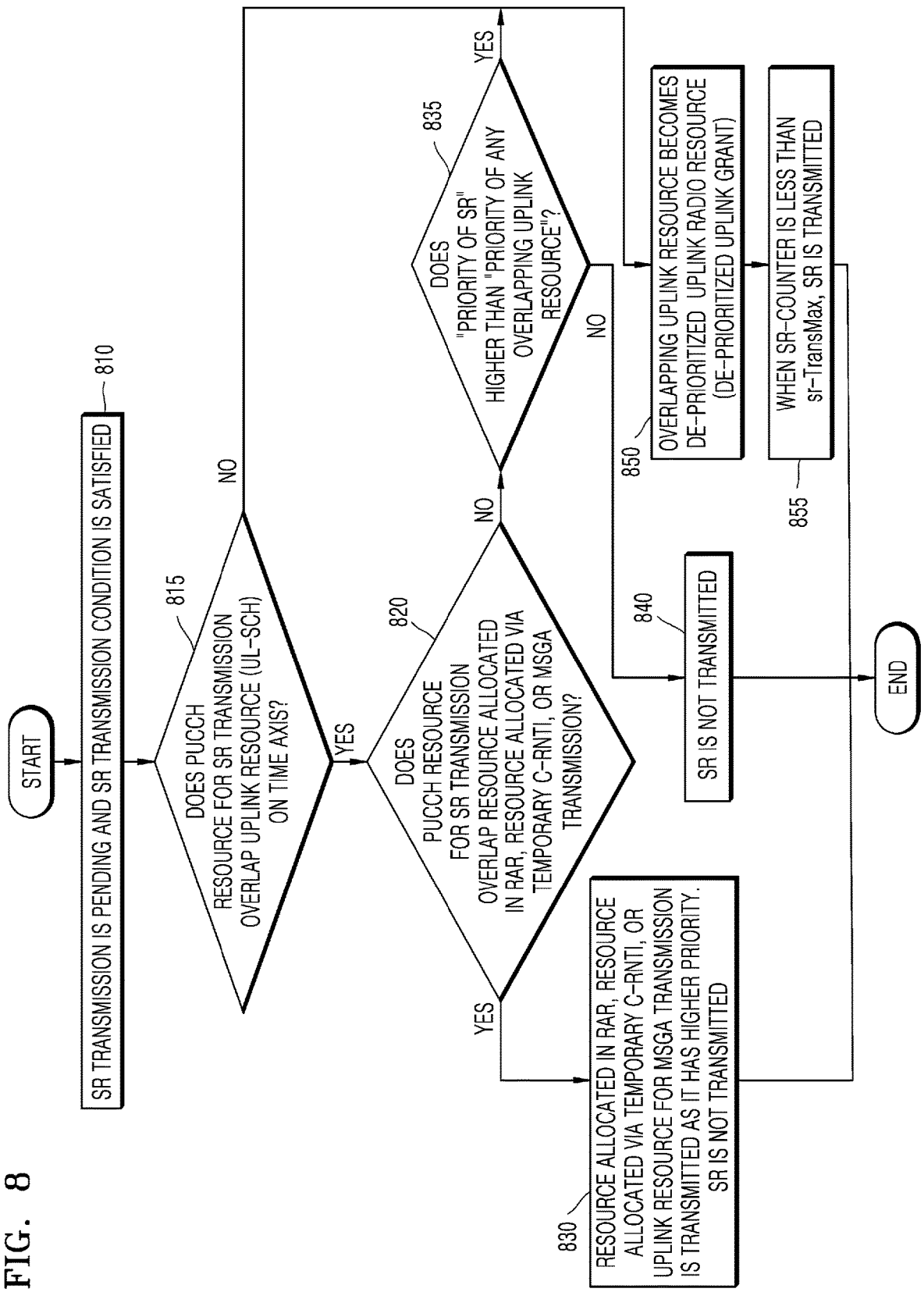
FIG. 8 is a flowchart illustrating a detailed operation of performing SR transmission in logical channel-based prioritization in a wireless communication system, according to an embodiment of the present disclosure.

FIG. 8 is a flowchart illustrating a detailed operation of performing SR transmission in logical channel-based prioritization in a wireless communication system, according to an embodiment of the present disclosure.

A PUCCH resource on which an SR may be transmitted as SR transmission occurs may overlap other PUSCH resources on the time axis or on the time axis and the frequency axis. The PUSCH resources may include an uplink radio resource for transmitting a message A, an uplink radio resource received in RAR, an uplink radio resource allocated with a temporary C-RNTI, an uplink radio resource for transmitting data of a logical channel, or the like. The embodiment of FIG. 8 is for describing an operation performed by a terminal when message A transmission has occurred, or the terminal has allocated an uplink radio resource in RAR or has allocated a resource via a temporary C-RNTI, and signal transmission on the allocated resource always has a higher priority than that of SR transmission.

Referring to FIG. 8, in operation 810, it may be assumed that SR transmission is pending and an SR transmission condition is satisfied. According to an embodiment, the SR transmission condition may be that, when a triggered SR is pending, an MAC entity has an SR transmission occasion of a valid PUCCH resource for a configuration of the pending SR, the SR prohibit timer does not operate during the SR transmission occasion, and a PUCCH resource for the SR transmission occasion does not overlap a measurement gap.

In operation 815, when the pending SR satisfies the SR transmission condition, the terminal may check whether the PUC CH resource for the SR transmission overlaps an uplink radio resource (e.g., a UL-SCH or a PUSCH) on the time axis. When the PUCCH resource for the SR transmission overlaps the uplink resource on the time axis, the terminal may perform operation 820.

In operation 820, when the PUCCH resource for the SR transmission overlaps the uplink resource on the time axis, the terminal may check whether the overlapping resource is one of a resource received in RAR, a resource allocated with a temporary C-RNTI, or message A transmission that has occurred. In addition, the terminal may check whether the PUCCH resource for the SR transmission overlaps, on the time axis, at least one of the resource received in RAR, the resource allocated with the temporary C-RNTI, or the message A transmission that has occurred. When they overlap each other, the terminal may perform operation 830, and otherwise, the terminal may perform operation 835.

In operation 830, when the PUCCH resource for the SR transmission overlaps, on the time axis, at least one of the resource received in RAR, the resource allocated with the temporary C-RNTI, or the message A transmission that has occurred, one of the resource received in RAR, the resource allocated with the temporary C-RNTI, or the message A transmission that has occurred may have priority over the SR transmission. In addition, the terminal may transmit the data or message A having priority. Accordingly, the SR transmission cannot be performed in an SR transmission occasion in which the PUCCH resource for the SR transmission overlaps, on the time axis, at least one of the resource received in RAR, the resource allocated with the temporary C-RNTI, or the message A transmission that has occurred. Accordingly, in the overlapping SR transmission occasion, an operation for the SR transmission may be stopped. Accordingly, the SR transmission may not be indicated to a lower layer.

In operation 835, when the PUCCH resource for the SR transmission does not overlap, on the time axis, at least one of the resource received in RAR, the resource allocated with the temporary C-RNTI, or the message A transmission that has occurred, the terminal may perform an operation of comparing the priority of the SR transmission with the priority of another uplink radio resource (e.g., a UL-SCH or a PUSCH) that overlaps the SR transmission. For example, the terminal may determine whether "the priority of the SR" is higher than "the priority of any uplink resource" that overlaps the resource for the SR transmission. In this case, the priority of the SR transmission may refer to the priority of a logical channel that has triggered the SR. When the SR transmission is triggered by a MAC CE, the priority of the SR transmission may be lower than the priority of any logical channel for data. In this way, in a logical channel-based prioritization operation, the terminal may transmit an SR or data by comparing the priorities of a resource for SR transmission and other overlapping PUSCH resources (i.e., uplink radio resources) on the time axis, and prioritizing the resource having a higher priority.

When the priority of the SR is not higher than the priority of any overlapping uplink radio resource, in operation 840, the SR may not be transmitted. That is, in operation 835, when the priority of the SR is lower than or equal to the priority of any overlapping uplink radio resource on the time axis within a MAC entity (in a cell group), the SR may be unable to be transmitted. Accordingly, in the SR transmission occasion, the operation for the SR transmission may be stopped. Accordingly, the SR transmission may not be indicated to a lower layer.

When the priority of the SR is higher than the priority of any overlapping uplink radio resource, the SR may be transmitted. In addition, in operation 850, the overlapping uplink resource may become a de-prioritized uplink radio resource (a de-prioritized uplink grant). In addition, in operation 855, when SR_COUNTER is less than an sr-TransMax value, which is a preset threshold, the SR may be actually transmitted.

Figure 9:
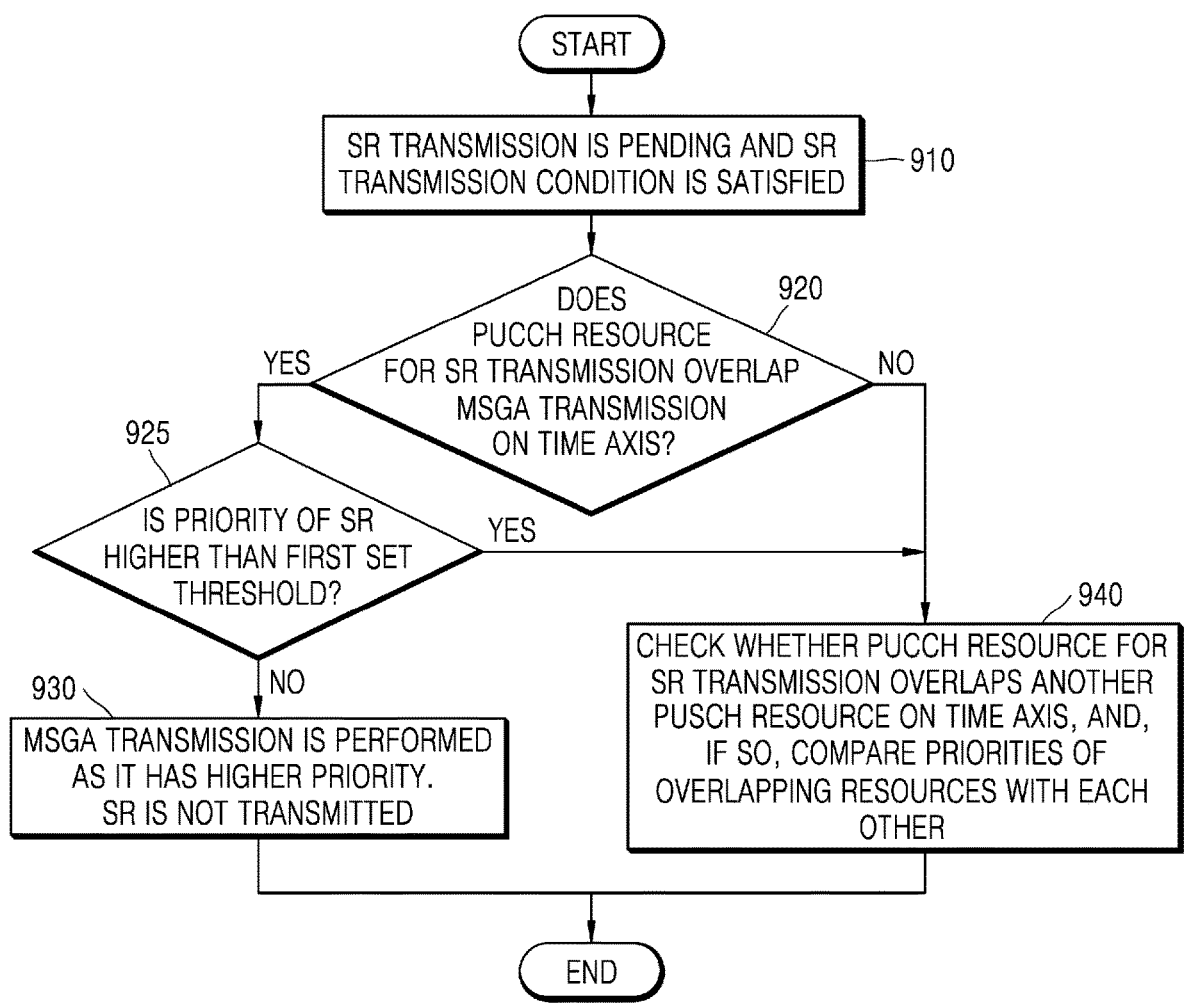
FIG. 9 is a flowchart illustrating a detailed operation of performing SR transmission in logical channel-based prioritization in a wireless communication system, according to another embodiment of the present disclosure.

FIG. 9 is a flowchart illustrating a detailed operation of performing SR transmission in logical channel-based prioritization in a wireless communication system, according to another embodiment of the present disclosure.

A PUCCH resource on which an SR may be transmitted as SR transmission occurs may overlap other PUSCH resources on the time axis or on the time axis and the frequency axis. The PUSCH resources may include an uplink radio resource for transmitting a message A, an uplink radio resource received in RAR, an uplink radio resource allocated with a temporary C-RNTI, an uplink radio resource for transmitting data of a logical channel, or the like. The uplink radio resource for transmitting the message A, the uplink radio resource received in RAR, or the uplink radio resource allocated with the temporary C-RNTI is a resource for an RA operation, and thus needs to have a higher priority than that of the uplink radio resource for transmitting data of a logical channel. However, because data for a URLLC service has higher service requirements, the data for the URLLC service needs to be transmitted with higher priority than that of a resource such as the uplink radio resource for transmitting the message A, the uplink radio resource received in RAR, or the uplink radio resource allocated with the temporary C-RNTI. As a method for this, a method using a priority threshold is described in the embodiment of FIG. 9. That is, when the priority of the SR is higher than a preset first threshold, the SR transmission may be performed with a higher priority than that of the uplink radio resource, the uplink radio resource received in RAR, or the uplink radio resource allocated with the temporary C-RNTI.

Referring to FIG. 9, in operation 910, it may be assumed that SR transmission is pending and an SR transmission condition is satisfied.

In operation 920, a terminal may check whether a PUCCH resource for the SR transmission overlaps transmission of a message A on the time axis. That is, the terminal may check whether the PUC CH resource for the SR transmission overlaps, on the time axis, the PUSCH resource for transmission of the message A. Although not shown in operation 920, in operation 920, the terminal may perform comparison not only with the resource for the transmission of the message A, but also with the resource received in RAR or the uplink radio resource allocated with the temporary C-RNTI. That is, the terminal may check whether the PUCCH resource for the SR transmission overlaps the resource for transmission of the message A, the resource received in RAR, or the uplink radio resource allocated with the temporary C-RNTI.

When the PUCCH resource for the SR transmission overlaps, on the time axis, the message A transmission (or the resource received in RAR or the uplink radio resource allocated with the temporary C-RNTI), the terminal may perform operation 925.

In operation 925, when the PUCCH resource for the SR transmission overlaps, on the time axis, the message A transmission (or the resource received in RAR or the uplink radio resource allocated with the temporary C-RNTI), the terminal may check whether the priority of the SR transmission is higher than the set first threshold. Here, the priority of the SR transmission may be set as the priority of a logical channel that has triggered the SR. When the priority of the SR transmission is not higher than the preset first threshold, the terminal may perform operation 930.

In operation 930, when the priority of the SR transmission is not higher than the preset first threshold, the message A transmission (or the resource received in RAR or the uplink radio resource allocated with the temporary C-RNTI) may have priority and thus be performed. In this case, the SR may not be transmitted, and the operation for the SR transmission may be stopped.

When the priority of the SR is higher than the set first threshold in step 925, or when the PUCCH resource for the SR transmission does not overlap, on the time axis, the message A transmission (or the resource received in RAR or the uplink radio resource allocated with the temporary C-RNTI) in operation 920, the terminal may perform operation 940.

In operation 940, the terminal may check whether the PUCCH resource for the SR transmission overlaps another PUSCH resource on the time axis. In addition, when the PUCCH resource for the SR transmission overlaps another PUSCH resource on the time axis, the terminal may compare the priorities of the overlapping resources with each other. For example, the terminal may compare the priorities with each other to determine whether to perform the SR transmission or whether another uplink radio resource (e.g., a PUSCH or a UL-SCH) has priority.

Figure 10:
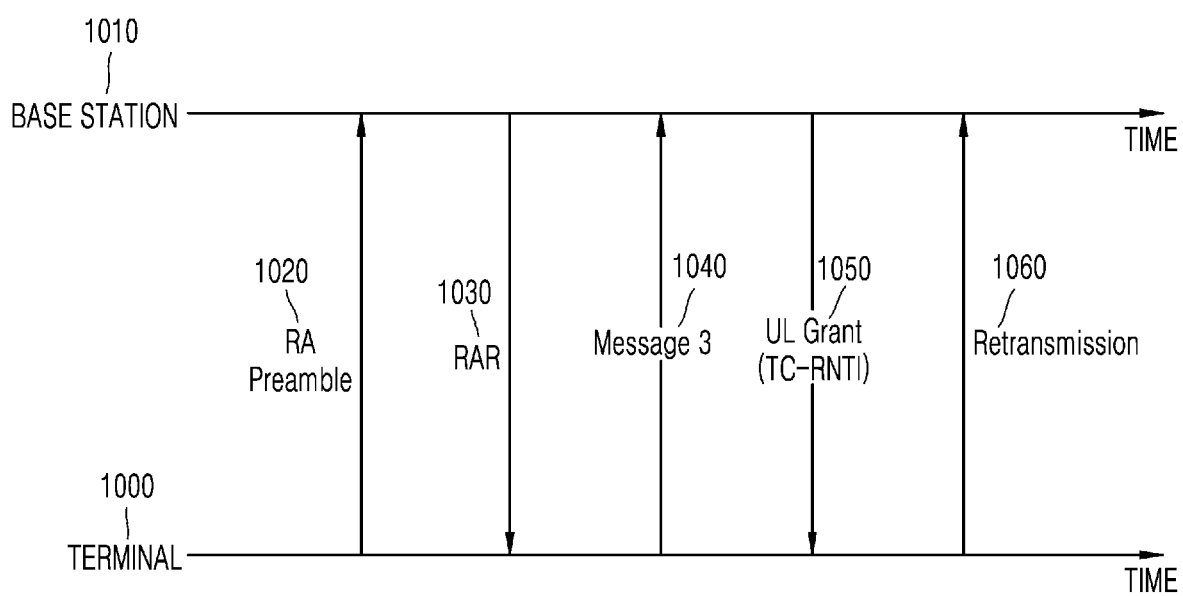
FIG. 10 is a diagram illustrating an operation, performed by a terminal, of performing four-step random access to a base station in a wireless communication system, according to an embodiment of the present disclosure.

FIG. 10 is a diagram illustrating an operation, performed by a terminal, of performing four-step RA to a BS in a wireless communication system, according to an embodiment of the present disclosure. When the terminal needs to perform initial access, or according to uplink synchronization or the need of a BS, the BS may indicate the terminal to perform RA.

When a terminal 1000 needs to perform RA to a BS 1010, the terminal may transmit an RA preamble 1020 to the BS. In this case, the RA preamble transmitted by the terminal to the BS may include an RA preamble preconfigured by the BS, and RA using such a preconfigured RA preamble may be referred to as CFRA. Alternatively, terminals performing RA may share RA preambles, and a terminal may use one available RA preamble among at least one shared RA preamble. Such RA may be referred to as CBRA. A type of RA to be used may be configured by a BS for a terminal. In addition, when there is no RA preamble available to the terminal, the terminal may perform CBRA.

According to an embodiment, when the terminal transmits an RA preamble, the BS having received the RA preamble may calculate an arrival time of the RA preamble to adjust a TA value indicating a time point at which the terminal starts uplink transmission. In addition, the BS may allocate an uplink radio resource to allow the terminal having transmitted the RA preamble to start data transmission. A message transmitted by the BS to the terminal in response to the RA preamble may be an RAR 1030. The RAR message may include a TA value that the terminal needs to adjust, allocation information of an uplink radio resource that the terminal having received the RAR may use to transmit data, a temporary C-RNTI that may be used during an RA process, and the like.

As the resource that the terminal having received the RAR may use to transmit data, an uplink radio resource indicated by a radio resource allocation information included in the RAR message may be referred to as "uplink radio resource received in RAR", that is, "uplink grant received in RAR". In this case, in the RA operation, when a message 3 1040 generated for the purpose of a connection request or the like needs to be transmitted, the uplink radio resource received in RAR may include a MAC PDU in the message 3 buffer and may be transmitted.

In an embodiment, when the terminal is allocated an uplink radio resource received in RAR, but there is no MAC PDU in the message 3 buffer, the terminal may generate a MAC PDU by performing a logical channel prioritization (LCP) process on data or a MAC CE of another logical channel (LCH), and transmit the MAC PDU on the corresponding resource. As such, when it is necessary to transmit the MAC PDU in the message 3 buffer on the uplink radio resource received in RAR, the MAC PDU to be transmitted is associated with the random access operation and may be regarded as more important information than general data. According to an embodiment, the BS may request retransmission from the terminal due to an issue such as failure of uplink transmission using the uplink radio resource received in RAR. In this case, the BS may allocate a retransmission resource (e.g., a UL grant (TC-RNTI) 1050) by using a temporary C-RNTI included in the RAR 1030. The allocation of the retransmission resource may be performed by using a downlink control information (DCI) format for a physical downlink control channel (PDCCH) physical channel.

Thereafter, the terminal may perform retransmission 1060 by using the allocated retransmission resource. As such, even when data is transmitted by using a temporary C-RNTI, the MAC PDU in the message 3 buffer may need to be transmitted, and thus the uplink radio resource may be considered as more important information than general data. Because the uplink radio resource allocated by using the temporary C-RNTI is a resource for the retransmission 1060 of the uplink radio resource received in RAR, in some embodiments, a detailed operation may be described in which the uplink radio resource allocated by using the temporary C-RNTI is regarded as the uplink radio resource received in RAR.

Figure 11:
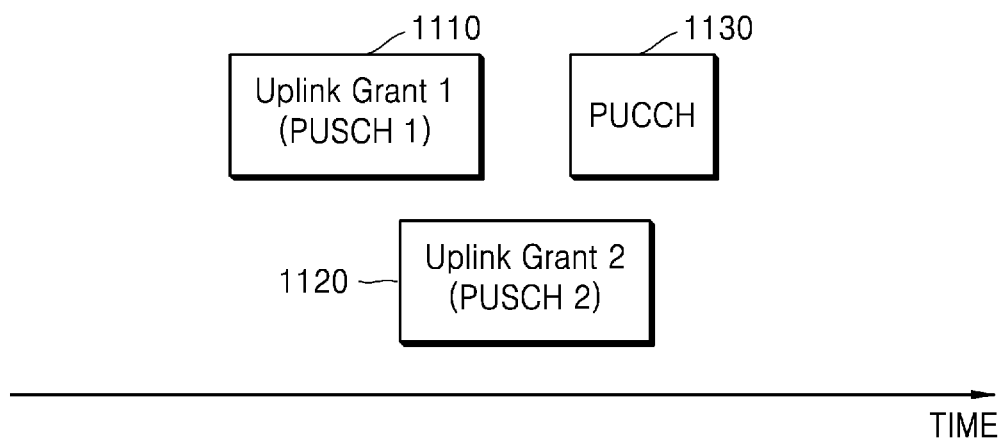
FIG. 11 is a diagram illustrating a scenario in which an uplink radio resource allocated to a physical uplink shared channel (PUSCH) overlaps a physical uplink control channel (PUCCH) resource on a time axis in a wireless communication system, according to an embodiment of the present disclosure.

FIG. 11 is a diagram illustrating a scenario in which an uplink radio resource allocated to a PUSCH overlaps a PUCCH resource on a time axis in a wireless communication system, according to an embodiment of the present disclosure.

According to an embodiment, the scenario in which the uplink radio resource allocated to the PUSCH overlaps the PUCCH resource on the time axis may mean that, in a radio resource domain including time domains and frequency domains, at least a part of the uplink radio resource allocated to the PUSCH and at least a part of the PUCCH resource exist in the same time domain.

Referring to FIG. 11, in an embodiment, PUSCH resources (e.g., PUSCH 1 1110 and PUSCH 2 1120) allocated to a terminal may correspond to a UL-SCH in a transport channel. A resource allocated to a UL-SCH may be referred to as an uplink radio resource, which may be referred to as an uplink grant. Such an uplink radio resource may be used to transmit a MAC PDU that has occurred in a MAC layer. In addition, a PUCCH resource 1130 for the terminal to transmit uplink control information of a physical layer may also occur. The PUCCH resource 1130 may be used in various examples, such as for sending hybrid automatic repeat request (HARQ) feedback with respect to downlink data transmission. According to an embodiment, an SR may also be transmitted on a PUCCH resource. However, the transmission of the SR may be included in the embodiment of FIG. 11 or may be excluded and thus not applied.

FIG. 11 illustrates an example in which the PUSCH resources (e.g., the PUSCH 1 1110 and the PUSCH 2 1120) corresponding to uplink radio resources overlap the PUCCH resource 1130 on the time axis. According to an embodiment, when only one uplink radio resource corresponding to a PUSCH resource needs to be transmitted in a single cell at the same time point, the terminal may select one uplink radio resource arbitrarily or according to a preset rule, and perform transmission. Which uplink radio resource the terminal selects may be determined by the priority values of the overlapping uplink radio resources, and the uplink radio resource having the highest priority among the overlapping uplink radio resources may be selected and transmitted.

In an embodiment, when a certain uplink radio resource is selected and the selected resource is transmitted, the selected radio resource may refer to a prioritized resource. On the contrary, the unselected resource may refer to a de-prioritized resource.

According to an embodiment, a PUCCH resource may be used to transmit information in the form of an uplink control information (UCI) message to be actually transmitted by the terminal. Also, in an embodiment, the terminal may use a PUCCH resource only when the terminal performs transmission on the PUCCH as an actual UCI message occurs. In the present disclosure, it may be assumed that there is a UCI message to be transmitted by using a PUCCH, such as HARQ feedback. In this case, because the PUCCH and a PUSCH corresponding to an uplink radio resource cannot be simultaneously transmitted within a MAC entity at the same time point, the terminal needs to select and transmit one of the PUCCH resource and the PUSCH resource.

When the terminal selects the PUCCH resource, because transmission of all overlapping PUSCHs within the MAC entity cannot be performed, inefficiency of resource transmission may occur. In addition, because a BS in charge of reception of PUCCH and PUSCH resources experiences an increase in complexity of prediction and decoding of transmission of the terminal, the UCI message transmitted in the PUCCH may be included in the PUSCH resource and transmitted together with a MAC PDU (transport block). According to an embodiment, as described above, transmission of the UCI message and the MAC PDU together may be referred to as UCI multiplexing.

FIG. 11 illustrates that the PUSCH resource (PUSCH 2) 1120 corresponding to a second uplink radio resource overlaps, on the time axis, the PUCCH resource 1130 on which the UCI message is transmitted. In this case, the UCI message scheduled to be transmitted on the PUCCH may be included in the PUSCH resource (PUSCH 2) 1120 and transmitted together with the MAC PDU. In this case, transmission of the PUCCH resource 1130 is not performed, and PUSCH transmission needs to be performed on the PUSCH resource (PUSCH 2) 1120.

However, because the PUSCH resource (PUSCH 2) 1120 corresponding to the second uplink radio resource overlaps, on the time axis, the PUSCH resource (PUSCH 1) 1110 corresponding to a first uplink radio resource, when the PUSCH resource (PUSCH 1) 1110 corresponding to the first uplink radio resource becomes a prioritized uplink radio resource (prioritized uplink grant), the PUSCH resource (PUSCH 2) 1120 corresponding to the second uplink radio resource may become a de-prioritized uplink radio resource (de-prioritized uplink grant) and thus may not be transmitted.

However, because the PUSCH resource (PUSCH 2) 1120 corresponding to the second uplink radio resource includes the UCI message, and a physical layer operation may be delayed when the UCI message is not transmitted, transmission of the PUSCH including the UCI message may need to be performed.

In an embodiment, the PUSCH resource (PUSCH 2) 1120 corresponding to the second uplink radio resource transmitted including the UCI message may become a prioritized uplink radio resource (prioritized uplink grant) and be transmitted. In addition, the PUSCH resource (PUSCH 1) 1110 corresponding to the first uplink radio resource and overlapping, on the time axis, the PUSCH resource (PUSCH 2) 1120 corresponding to the second uplink radio resource may become a de-prioritized uplink radio resource.

In another embodiment, the UCI message may be transmitted on the PUSCH resource only when the PUSCH resource that overlaps the PUCCH resource on the time axis may be transmitted in the physical layer. In the embodiment of FIG. 11, when the PUSCH resource (PUSCH 2) 1120 corresponding to the second uplink radio resource becomes a de-prioritized uplink radio resource, the UCI message that may be transmitted on the PUC CH resource 1130 may be transmitted on the PUCCH resource 1130.

Figure 12:
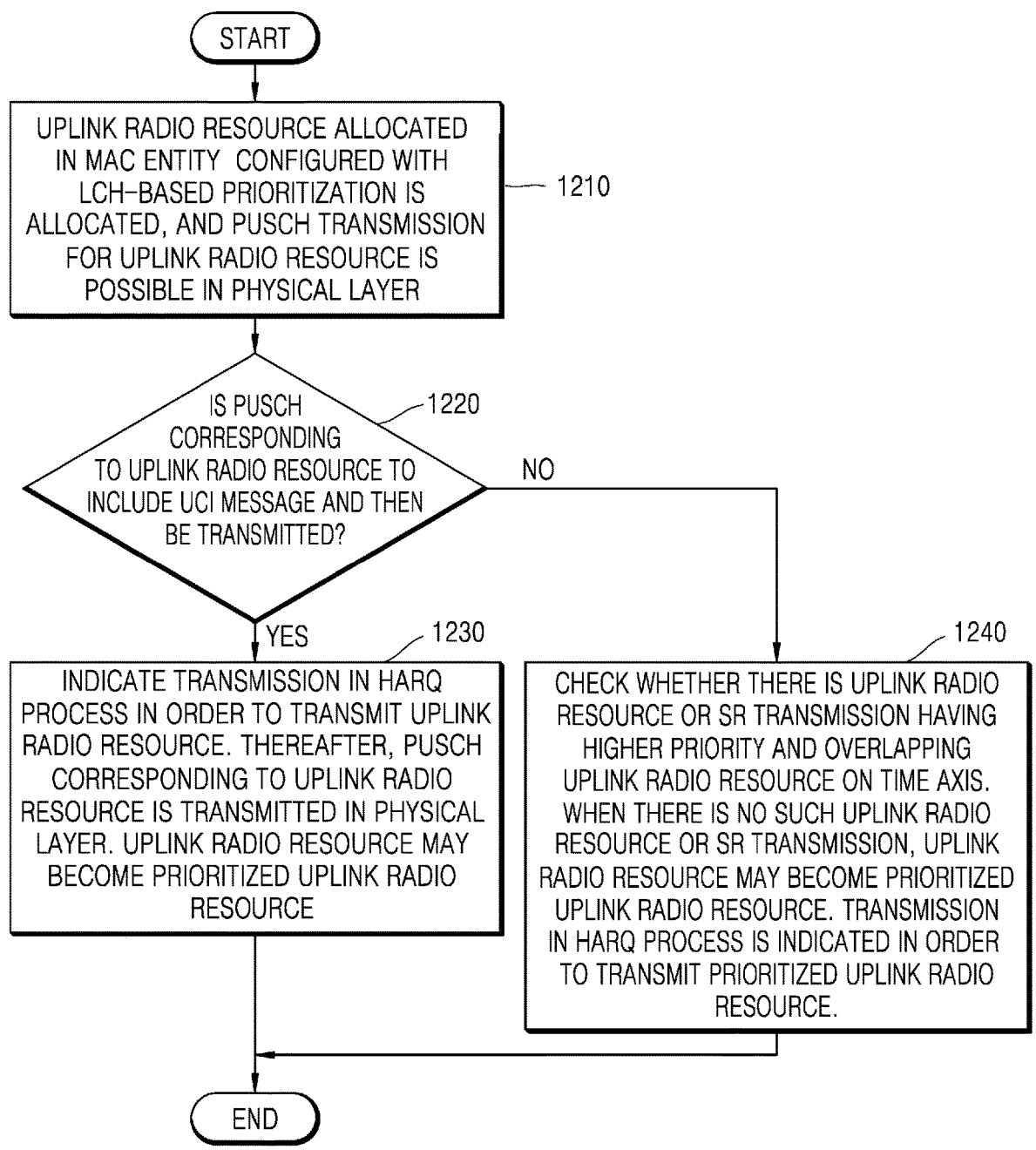
FIG. 12 is a flowchart illustrating an uplink radio resource prioritization operation according to whether an uplink control information (UCI) message is included during a logical channel (LCH)-based prioritization operation in a wireless communication system, according to an embodiment of the present disclosure.

FIG. 12 is a flowchart illustrating an uplink radio resource prioritization operation according to whether a UCI message is included during an LCH-based prioritization operation in a wireless communication system, according to an embodiment of the present disclosure.

As described above with reference to FIG. 11, a plurality of uplink radio resources (e.g., PUSCH resources) may overlap each other on the time axis or on the time axis and the frequency axis. In addition, a PUCCH resource and an uplink radio resource may overlap each other on the time axis or on the time axis and the frequency axis. Such a scenario may occur when an LCH-based prioritization operation is configured. However, the embodiment of FIG. 12 may be performed regardless of whether an LCH-based prioritization operation is configured.

In the embodiment of FIG. 12, a scenario is described in which, when a terminal needs to transmit a PUSCH including a UCI message, a corresponding uplink radio resource has a higher priority. Accordingly, when the PUSCH including the UCI message needs to be transmitted, and the corresponding uplink radio resource occurs, the terminal may transmit data by using the uplink radio resource. However, in an embodiment, only when transmission of the PUSCH including the UCI message is possible in the physical layer, the terminal may perform an operation for transmission of the uplink radio resource corresponding to the PUSCH including the UCI message.

Referring to FIG. 12, in operation 1210, it may be assumed that an uplink radio resource is allocated, to the terminal, in a MAC entity configured with LCH-based prioritization, and PUSCH transmission for the uplink radio resource (the uplink radio resource allocated to the terminal in the MAC entity configured with LCH-based prioritization) is possible in the physical layer. According to an embodiment, that PUSCH transmission is possible in the physical layer may mean that a sufficient time period exists to prepare actual radio transmission for an uplink radio resource corresponding to the PUSCH resource.

In operation 1220, when LCH-based prioritization is configured, the terminal may check whether the PUSCH resource corresponding to the uplink radio resource includes a UCI message. When the UCI message is included and transmitted in the PUSCH resource corresponding to the uplink radio resource, the PUSCH resource needs to be transmitted because it contains physical layer control information. Otherwise, when the UCI message is not included and transmitted in the PUSCH resource, whether to use and transmit the PUSCH resource may be determined based on the priority of the uplink radio resource determined by the MAC layer.

In operation 1230, when the UCI message is included and transmitted in the PUSCH resource corresponding to the uplink radio resource (the uplink radio resource allocated to the terminal in the MAC entity configured with LCH-based priority), actual transmission (e.g., PUSCH transmission) may be performed on the uplink radio resource. In order to transmit the uplink radio resource in this way, transmission may be indicated to a HARQ process. Thereafter, the PUSCH corresponding to the uplink radio resource may be actually transmitted in the physical layer. To this end, in an embodiment, the uplink radio resource may become a prioritized uplink radio resource (prioritized uplink grant), another overlapping uplink radio resource on the time axis may become a de-prioritized uplink radio resource (de-prioritized uplink grant). In this case, actual transmission (e.g., PUSCH transmission) may not be performed on the de-prioritized uplink radio resource.

According to an embodiment, in order to cause PUSCH transmission including the UCI message to actually occur, the uplink radio resource corresponding to the PUSCH resource including the UCI message to be transmitted may have the highest priority value.

In operation 1240, when the UCI message is not included and transmitted in the PUSCH resource corresponding to the uplink radio resource (the uplink radio resource allocated to the terminal in the MAC entity configured with LCH-based priority), whether actual transmission is performed on the uplink radio resource may be determined by comparing the priority of the uplink radio resource with that of another overlapping uplink radio resource on the time axis or a PUCCH resource of SR transmission. In other words, it may be checked whether there is an uplink radio resource or SR transmission having a higher priority and overlapping the uplink radio resource on the time axis, and when there is no such uplink radio resource or SR transmission, the uplink radio resource may become a prioritized uplink radio resource. In addition, in order to transmit the prioritized uplink radio resource, transmission may be indicated to the HARQ process.

Figure 13:
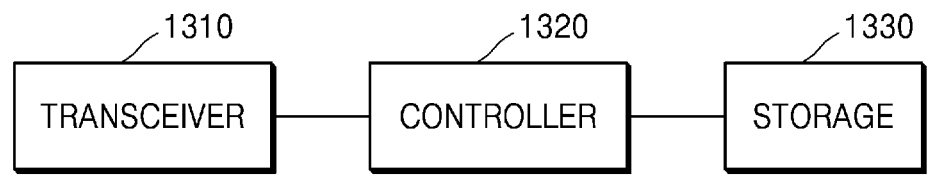
FIG. 13 is a diagram illustrating a structure of a terminal according to an embodiment of the present disclosure.

FIG. 13 is a diagram illustrating a structure of a terminal according to an embodiment of the present disclosure.

As illustrated in FIG. 13, the terminal of the present disclosure may include a transceiver 1310, a controller 1320, and a storage 1330. However, the components of the terminal are not limited to the above-described examples. For example, the terminal may include more or fewer components than the above-described components. In addition, the transceiver 1310, the controller 1320, and the storage 1330 may be implemented as a single chip.

Referring to FIG. 13, the terminal may include the transceiver 1310, the controller 1320, and the storage 1330. In the present disclosure, the controller 1320 may be defined as a circuit, an ASIC, or at least one processor.

According to an embodiment, the transceiver 1310 may transmit and receive signals to and from another network entity. For example, the transceiver 1310 may receive system information from a BS, and may receive a synchronization signal or a reference signal.

The transceiver 1310 may transmit and receive signals to and from a BS. A signal transmitted to and received from the BS may include control information and data. The transceiver 1310 may include a radio frequency (RF) transmitter for up-converting and amplifying a frequency of a signal being transmitted, and an RF receiver for low-noise-amplifying a received signal and down-converting a frequency of the received signal. However, this is merely an example of the transceiver 1310, the components of which are not limited to the RF transmitter and the RF receiver. Also, the transceiver 1310 may receive a signal through a radio channel and output the signal to the controller 1320, and may transmit, through a radio channel, a signal output from the controller 1320.

According to an embodiment, the controller 1320 may control the overall operation of the terminal according to an embodiment proposed in the present disclosure. For example, the controller 1320 may control a signal flow between blocks to perform an operation according to the above-described flowchart. In addition, it is possible to control the components of the terminal to perform a method for prioritization of radio resource by RA in LCH-based prioritization according to an embodiment of the present disclosure. A plurality of controllers 1320 may be provided, and the controller 1320 may execute a program stored in the storage 1330 to perform an operation for prioritization of radio resource by RA of the present disclosure as described above.

According to an embodiment, the storage 1330 may store at least one of pieces of information transmitted and received through the transceiver 1310 and information generated by the controller 1320.

Also, the storage 1330 may store programs and data necessary for the operation of the terminal. Also, the storage 1330 may store control information or data included in a signal transmitted and received by the terminal. The storage 1330 may be implemented as a storage medium such as read-only memory (ROM), random-access memory (RAM), a hard disk, a compact disc ROM (CD-ROM), or a digital versatile disc (DVD), or a combination thereof. In addition, a plurality of storages 1330 may be provided. According to an embodiment, the storage 1330 may store a program for performing an operation for prioritization of radio resource by RA in LCH-based prioritization according to embodiments of the present disclosure as described above.

Figure 14:
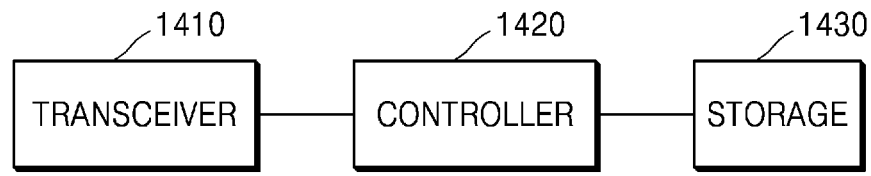
FIG. 14 is a diagram illustrating a structure of a base station according to an embodiment of the present disclosure.

FIG. 14 is a diagram illustrating a structure of a BS according to an embodiment of the present disclosure.

As illustrated in FIG. 14, the BS of the present disclosure may include a transceiver 1410, a controller 1420, and a storage 1430. However, the components of the BS are not limited to the above-described examples. For example, the BS may include more or fewer components than the above-described components. In addition, the transceiver 1410, the controller 1420, and the storage 1430 may be implemented as a single chip.

Referring to FIG. 14, the BS may include the transceiver 1410, the controller 1420, and the storage 1430. In the present disclosure, the controller 1420 may be defined as a circuit, an ASIC, or at least one processor.

According to an embodiment, the transceiver 1410 may transmit and receive signals to and from another network entity. For example, the transceiver 1410 may transmit system information to a terminal, and may transmit a synchronization signal or a reference signal.

The transceiver 1410 may transmit and receive signals to and from a terminal. A signal transmitted to and received from the terminal may include control information and data. The transceiver 1410 may include an RF transmitter for up-converting and amplifying a frequency of a signal being transmitted, and an RF receiver for low-noise-amplifying a received signal and down-converting a frequency of the received signal. However, this is merely an example of the transceiver 1410, the components of which are not limited to the RF transmitter and the RF receiver. Also, the transceiver 1410 may receive a signal through a radio channel and output the signal to the controller 1420, and may transmit, through a radio channel, a signal output from the controller 1420.

According to an embodiment, the controller 1420 may control the overall operation of the BS according to an embodiment proposed in the present disclosure. For example, the controller 1420 may control a signal flow between blocks to perform an operation according to the above-described flowchart. In addition, it is possible to control the components of the BS to perform a method for prioritization of radio resource by RA in LCH-based prioritization according to an embodiment of the present disclosure. A plurality of controllers 1420 may be provided, and the controller 1420 may execute a program stored in the storage 1430 to perform an operation for prioritization of radio resource by RA of the present disclosure as described above.

According to an embodiment, the storage 1430 may store at least one of pieces of information transmitted and received through the transceiver 1410 and information generated by the controller 1420.

Also, the storage 1430 may store control information or data included in a signal transmitted and received by the BS. The storage 1430 may be implemented as a storage medium such as ROM, RAM, a hard disk, a CD-ROM, or a DVD, or a combination thereof. In addition, a plurality of storages 1430 may be provided. According to an embodiment, the storage 1430 may store a program for performing an operation for prioritization of radio resource by RA in LCH-based prioritization according to embodiments of the present disclosure as described above.

According to an embodiment of the present disclosure, an operation method of a terminal in a wireless communication system may include, when transmission of an SR is pending and LCH-based prioritization is configured for a MAC entity of the terminal, identifying whether a PUCCH resource associated with transmission of the SR overlaps, in time, a PUSCH resource associated with transmission of a message A, when the PUCCH resource associated with the transmission of the SR does not overlap, in time, the PUSCH resource associated with the transmission of the message A, identifying whether the PUCCH resource associated with the transmission of the SR overlaps, in time, a PUSCH resource associated with uplink data, and when the PUCCH resource associated with the transmission of the SR overlaps, in time, the PUSCH resource associated with the uplink data, transmitting the SR or the uplink data to a BS by comparing a priority of the PUCCH resource associated with the transmission of the SR with a priority of the PUSCH resource associated with the uplink data.

According to an embodiment, the transmitting of the SR or the uplink data to the BS by comparing the priority of the PUCCH resource associated with the transmission of the SR with the priority of the PUSCH resource associated with the uplink data may includes, when the priority of the PUCCH resource associated with the transmission of the SR is higher than the priority of the PUSCH resource associated with the uplink data, determining, as a prioritized resource, the PUCCH resource associated with the transmission of the SR, determining, as a de-prioritized resource, the PUSCH resource associated with the uplink data, and transmitting the SR to the base station on the PUCCH resource associated with the transmission of the SR.

According to an embodiment, the priority of the PUCCH resource associated with the transmission of the SR may indicate a priority of a logical channel that has triggered the SR.

According to an embodiment, the operation method may further include, when the PUCCH resource associated with the transmission of the SR overlaps, in time, the PUSCH resource associated with the transmission of the message A, determining, as a de-prioritized resource, the PUCCH resource associated with the transmission of the SR.

According to an embodiment, when the PUCCH resource associated with the transmission of the SR overlaps, in time, the PUSCH resource associated with the transmission of the message A, the SR may not be transmitted to the BS, and transmission of the SR may not be indicated to a lower layer for the MAC entity of the terminal.

According to an embodiment, the operation method may further include, when the PUCCH resource associated with the transmission of the SR overlaps, in time, the PUSCH resource associated with the transmission of the message A, determining, as a prioritized resource, the PUSCH resource associated with the transmission of the message A, and transmitting the message A to the BS on the PUSCH resource associated with the transmission of the message A.

According to an embodiment, the message A may be associated with two-step RA, and the message A may include an RA preamble associated with the two-step RA, and a PUSCH payload associated with the two-step RA.

According to an embodiment of the present disclosure, a terminal in a wireless communication system may include a transceiver, and at least one processor configured to, when transmission of an SR is pending and LCH-based prioritization is configured for a MAC entity of the terminal, identify whether a PUCCH resource associated with transmission of the SR overlaps, in time, a PUSCH resource associated with transmission of a message A, when the PUCCH resource associated with the transmission of the SR does not overlap, in time, the PUSCH resource associated with the transmission of the message A, identify whether the PUCCH resource associated with the transmission of the SR overlaps, in time, a PUSCH resource associated with uplink data, and, when the PUCCH resource associated with the transmission of the SR overlaps, in time, the PUSCH resource associated with the uplink data, transmit the SR or the uplink data to a BS through the transceiver, by comparing a priority of the PUCCH resource associated with the transmission of the SR with a priority of the PUSCH resource associated with the uplink data.

According to an embodiment, the at least one processor may be further configured to, when the priority of the PUCCH resource associated with the transmission of the SR is higher than the priority of the PUSCH resource associated with the uplink data, determine, as a prioritized resource, the PUCCH resource associated with the transmission of the SR, determine, as a de-prioritized resource, the PUSCH resource associated with the uplink data, and transmit the SR to the BS through the transceiver, on the PUCCH resource associated with the transmission of the SR.

According to an embodiment, the priority of the PUCCH resource associated with the transmission of the SR may indicate a priority of a logical channel that has triggered the SR.

According to an embodiment, the at least one processor may be further configured to, when the PUCCH resource associated with the transmission of the SR overlaps, in time, the PUSCH resource associated with the transmission of the message A, determine, as a de-prioritized resource, the PUCCH resource associated with the transmission of the SR.

According to an embodiment, when the PUCCH resource associated with the transmission of the SR overlaps, in time, the PUSCH resource associated with the transmission of the message A, the SR may not be transmitted to the BS, and transmission of the SR may not be indicated to a lower layer for the MAC entity of the terminal.

According to an embodiment, the at least one processor may be further configured to, when the PUCCH resource associated with the transmission of the SR overlaps, in time, the PUSCH resource associated with the transmission of the message A, determine, as a prioritized resource, the PUSCH resource associated with the transmission of the message A, and transmit the message A to the base station through the transceiver, on the PUSCH resource associated with the transmission of the message A.

According to an embodiment, the message A may be associated with two-step RA, and the message A may include an RA preamble associated with the two-step RA, and a PUSCH payload associated with the two-step RA.

Methods according to claims or embodiments described in the specification of the present disclosure may be implemented in hardware, software, or a combination of hardware and software.

When implemented in software, a computer-readable storage medium or a computer program product storing one or more programs (software modules) may be provided. The one or more programs stored in the computer-readable storage medium or computer program product are configured for execution by one or more processors in an electronic device. The one or more programs include instructions that cause the electronic device to execute the methods according to the embodiments described in claims or the specification of the present disclosure.

The programs (e.g., software modules or software) may be stored in non-volatile memory including RAM or flash memory, ROM, electrically erasable programmable ROM (EEPROM), a magnetic disc storage device, a CD-ROM, a DVD or other optical storage device, or a magnetic cassette. Alternatively, the programs may be stored in memory including a combination of some or all of the above-mentioned storage media. In addition, a plurality of such memory units may be included.

Also, the programs may be stored in an attachable storage device accessible through any or a combination of communication networks, such as the Internet, an intranet, a local area network (LAN), a wide LAN (WLAN), or a storage area network (SAN). The storage device may access, via an external port, a device for performing an embodiment of the present disclosure. Furthermore, a separate storage device on a communication network may access the device for performing an embodiment of the present disclosure.

In the present disclosure, the term "computer program product" or "computer-readable recording medium" is used to generally refer to a medium such as memory, a hard disc installed in a hard disc drive, or a signal. The "computer program product" or the "computer-readable recording medium" is for providing the method of performing prioritization of radio resource by RA in LCH-based prioritization according to the present disclosure.

In the embodiments of the present disclosure described above, the elements included in the present disclosure have been expressed in the singular or plural form according to the suggested embodiments of the present disclosure. However, the expression in the singular or plural form is appropriately selected according to the suggested situations for convenience of explanation and is not intended to limit the present disclosure to the single or plural elements, and even when a certain element is expressed in the plural form, it may be provided with a single element, and even when a certain element is expressed in the singular form, it may be provided with a plurality of elements.

Meanwhile, the embodiments of the present disclosure disclosed herein and the drawings are only particular examples for clearly describing the technical aspects of the present disclosure and helping understanding of the present disclosure, and are not intended to limit the scope of the present disclosure. That is, it would be obvious to one of skill in the art that other modifications based on the technical spirit of the present disclosure may be implemented. In addition, the above-described embodiments may be combined with one another and operated as necessary. For example, an embodiment of the present disclosure may be combined with parts of other embodiments of the present disclosure to operate a BS and a terminal. In addition, the embodiments of the present disclosure may be applied to other communication systems, and other modifications based on the technical spirit of the embodiments may also be implemented. For example, the embodiments may also be applied to an LTE system, a $5^{th}$ Generation (5G) or New Radio (NR) system, etc.

Although certain embodiments have been described in the detailed description of the present disclosure, various modifications may be made without departing from the scope of the present disclosure. Therefore, the scope of the present disclosure should not be limited to the above-described embodiments of the present disclosure and should be determined by the appended claims and the equivalents thereof.

The invention claimed is:

1. A method performed by a terminal in a wireless communication system, the method comprising:
   identifying that transmission of a scheduling request (SR) is pending;
   identifying whether a logical channel-based prioritization is configured for a medium access control (MAC) entity of the terminal;
   identifying whether a physical uplink control channel (PUCCH) resource associated with the transmission of the SR overlaps with a physical uplink shared channel (PUSCH) resource associated with transmission of a message A in a time domain;
   identifying whether the PUCCH resource associated with the transmission of the SR overlaps with a PUSCH resource associated with uplink data in the time domain; and
   in case that the logical channel-based prioritization is configured for the MAC entity, and that the PUCCH resource associated with the transmission of the SR does not overlap with the PUSCH resource associated with the transmission of the message A, and that the PUCCH resource associated with the transmission of the SR overlaps with the PUSCH resource associated with the uplink data, transmitting the SR or the uplink data to a base station by comparing a priority of the PUCCH resource associated with the transmission of the SR with a priority of the PUSCH resource associated with the uplink data.

2. The method of claim 1, wherein the transmitting of the SR or the uplink data to the base station by comparing the priority of the PUCCH resource associated with the transmission of the SR with the priority of the PUSCH resource associated with the uplink data comprises:

in case that the priority of the PUCCH resource associated with the transmission of the SR is higher than the priority of the PUSCH resource associated with the uplink data,
determining, as a prioritized resource, the PUCCH resource associated with the transmission of the SR,
determining, as a de-prioritized resource, the PUSCH resource associated with the uplink data, and
transmitting, to the base station, the SR on the PUCCH resource associated with the transmission of the SR.

3. The method of claim 2, wherein the priority of the PUCCH resource associated with the transmission of the SR indicates a priority of a logical channel that has triggered the SR.

4. The method of claim 1, further comprising:
in case that the PUCCH resource associated with the transmission of the SR overlaps with the PUSCH resource associated with the transmission of the message A, determining, as a de-prioritized resource, the PUCCH resource associated with the transmission of the SR.

5. The method of claim 4, wherein, in case that the PUCCH resource associated with the transmission of the SR overlaps with the PUSCH resource associated with the transmission of the message A, the SR is not transmitted to the base station, and the transmission of the SR is not indicated to a lower layer for the MAC entity of the terminal.

6. The method of claim 5, further comprising:
in case that the PUCCH resource associated with the transmission of the SR overlaps with the PUSCH resource associated with the transmission of the message A, determining, as a prioritized resource, the PUSCH resource associated with the transmission of the message A, and
transmitting, to the base station, the message A on the PUSCH resource associated with the transmission of the message A.

7. The method of claim 1, wherein the message A is associated with two-step random access, and
the message A includes a random access preamble associated with the two-step random access, and a PUSCH payload associated with the two-step random access.

8. A terminal in a wireless communication system, the terminal comprising:
a transceiver; and
at least one processor coupled with the transceiver and configured to:
identify that transmission of a scheduling request (SR) is pending;
identify whether a logical channel-based prioritization is configured for a medium access control (MAC) entity of the terminal;
identify whether a physical uplink control channel (PUCCH) resource associated with the transmission of the SR overlaps with a physical uplink shared channel (PUSCH) resource associated with transmission of a message A in a time domain;
identify whether the PUCCH resource associated with the transmission of the SR overlaps with a PUSCH resource associated with uplink data in the time domain; and
in case that the logical channel-based prioritization is configured for the MAC entity, and that the PUCCH resource associated with the transmission of the SR does not overlap with the PUSCH resource associated with the transmission of the message A, and that the PUCCH resource associated with the transmission of the SR overlaps with the PUSCH resource associated with the uplink data, transmit the SR or the uplink data to a base station by comparing a priority of the PUCCH resource associated with the transmission of the SR with a priority of the PUSCH resource associated with the uplink data.

9. The terminal of claim 8, wherein the at least one processor is further configured to:
in case that the priority of the PUCCH resource associated with the transmission of the SR is higher than the priority of the PUSCH resource associated with the uplink data,
determine, as a prioritized resource, the PUCCH resource associated with the transmission of the SR,
determine, as a de-prioritized resource, the PUSCH resource associated with the uplink data, and
transmit, to the base station, the SR on the PUCCH resource associated with the transmission of the SR.

10. The terminal of claim 9, wherein the priority of the PUCCH resource associated with the transmission of the SR indicates a priority of a logical channel that has triggered the SR.

11. The terminal of claim 8, wherein the at least one processor is further configured to:
in case that the PUCCH resource associated with the transmission of the SR overlaps with the PUSCH resource associated with the transmission of the message A, determine, as a de-prioritized resource, the PUCCH resource associated with the transmission of the SR.

12. The terminal of claim 11, wherein, in case that the PUCCH resource associated with the transmission of the SR overlaps with the PUSCH resource associated with the transmission of the message A, the SR is not transmitted to the base station, and the transmission of the SR is not indicated to a lower layer for the MAC entity of the terminal.

13. The terminal of claim 12, wherein the at least one processor is further configured to:
in case that the PUCCH resource associated with the transmission of the SR overlaps with the PUSCH resource associated with the transmission of the message A, determine, as a prioritized resource, the PUSCH resource associated with the transmission of the message A, and
transmit, to the base station, the message A on the PUSCH resource associated with the transmission of the message A.

14. The terminal of claim 8, wherein the message A is associated with two-step random access, and
the message A includes a random access preamble associated with the two-step random access, and a PUSCH payload associated with the two-step random access.

* * * * *